(12) United States Patent
Ritter et al.

(10) Patent No.: US 10,333,333 B2
(45) Date of Patent: Jun. 25, 2019

(54) WIRELESS CHARGING RETAIL SYSTEMS

(71) Applicant: Apple Inc., Cupertino, CA (US)

(72) Inventors: David W. Ritter, San Jose, CA (US); David B. Kosecoff, San Francisco, CA (US); David S. Kumka, San Francisco, CA (US); Madhusudanan Keezhveedi Sampath, San Jose, CA (US); Steven Charles Michalske, Sunnyvale, CA (US); Tavys Q. Ashcroft, San Jose, CA (US); Aditya Rao, San Francisco, CA (US); Ariadne Smith, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 15/184,875

(22) Filed: Jun. 16, 2016

(65) Prior Publication Data

US 2016/0372961 A1    Dec. 22, 2016

Related U.S. Application Data

(60) Provisional application No. 62/180,553, filed on Jun. 16, 2015.

(51) Int. Cl.
*H02J 7/00* (2006.01)
*H02J 7/02* (2016.01)
(Continued)

(52) U.S. Cl.
CPC .............. *H02J 7/025* (2013.01); *H01F 27/28* (2013.01); *H01F 38/14* (2013.01); *H02J 7/0044* (2013.01);
(Continued)

(58) Field of Classification Search
CPC .. H02J 7/025; H02J 50/10; H02J 50/12; H02J 7/0044; H01F 21/00; H01F 38/14
(Continued)

(56) References Cited

U.S. PATENT DOCUMENTS

2012/0248883 A1    10/2012 Karacaoglu et al.
2013/0024059 A1    1/2013 Jones et al.
(Continued)

OTHER PUBLICATIONS

Office Action (English Translation) dated May 11, 2017 in Taiwan Patent Application No. 105119026, 4 pages.
(Continued)

*Primary Examiner* — Stacy Whitmore
(74) *Attorney, Agent, or Firm* — Kilpatrick Townsend & Stockton LLP

(57) ABSTRACT

A wireless charging table comprising a table top having an upper surface upon which one or more electronic devices can be placed, a wireless charging transmitter positioned under the upper surface of the table top, the wireless charging transmitter comprising a plurality of transmitter coils that define a charging region at the upper surface of the table top, and a power distribution system operatively coupled to the wireless charging transmitter, the power distribution system configured to receive power from an alternating current (AC) power source and distribute power to the wireless charging transmitter. The plurality of transmitter coils include at least a first transmitter coil comprising: a first loop portion; a second loop portion; and a crossing portion comprising overlapping conductive paths that electrically couple the first loop portion.

14 Claims, 16 Drawing Sheets

(51) Int. Cl.
  *H02J 50/10* (2016.01)
  *H01F 38/14* (2006.01)
  *H01F 27/28* (2006.01)
  *H02J 50/40* (2016.01)
  *H02J 50/12* (2016.01)

(52) U.S. Cl.
  CPC .............. *H02J 50/10* (2016.02); *H02J 50/40* (2016.02); *H02J 50/12* (2016.02)

(58) Field of Classification Search
  USPC ........................................................ 320/107
  See application file for complete search history.

(56) References Cited

U.S. PATENT DOCUMENTS

| | | | | |
|---|---|---|---|---|
| 2013/0175875 A1* | 7/2013 | Kurs | ..................... | B60L 11/182 |
| | | | | 307/104 |
| 2013/0181535 A1* | 7/2013 | Muratov | ................. | H01F 38/14 |
| | | | | 307/104 |
| 2014/0070764 A1 | 3/2014 | Keeling | | |
| 2014/0091640 A1 | 4/2014 | Scholz et al. | | |
| 2014/0111154 A1 | 4/2014 | Roy et al. | | |
| 2014/0191584 A1* | 7/2014 | Kato | ..................... | H02J 7/0044 |
| | | | | 307/104 |
| 2014/0253024 A1* | 9/2014 | Rautiainen | .............. | H02J 7/025 |
| | | | | 320/108 |
| 2014/0320090 A1 | 10/2014 | Keeling | | |
| 2015/0188318 A1 | 7/2015 | Chen | | |
| 2016/0243949 A1* | 8/2016 | Merkel | .................... | H02J 7/025 |
| 2016/0308394 A1* | 10/2016 | Abdolkhani | ............ | H01F 38/14 |
| 2016/0316544 A1* | 10/2016 | Rice | ..................... | H05B 37/029 |
| 2016/0372960 A1 | 12/2016 | Ritter et al. | | |

OTHER PUBLICATIONS

PCT/US2016/037865, "International Search Report and Written Opinion", dated Oct. 6, 2016, 14 pages.

PCT/US2016/037865, "Invitation to Pay Add'l Fees and Partial Search Report", dated Aug. 9, 2016, 6 pages.

Non-Final Office Action dated Apr. 9, 2018 in U.S. Appl. No. 15/184,868. 19 pages. (copy not provided)

U.S. Appl. No. 15/184,868, Final Office Action, dated Aug. 30, 2018, 13 pages.

* cited by examiner

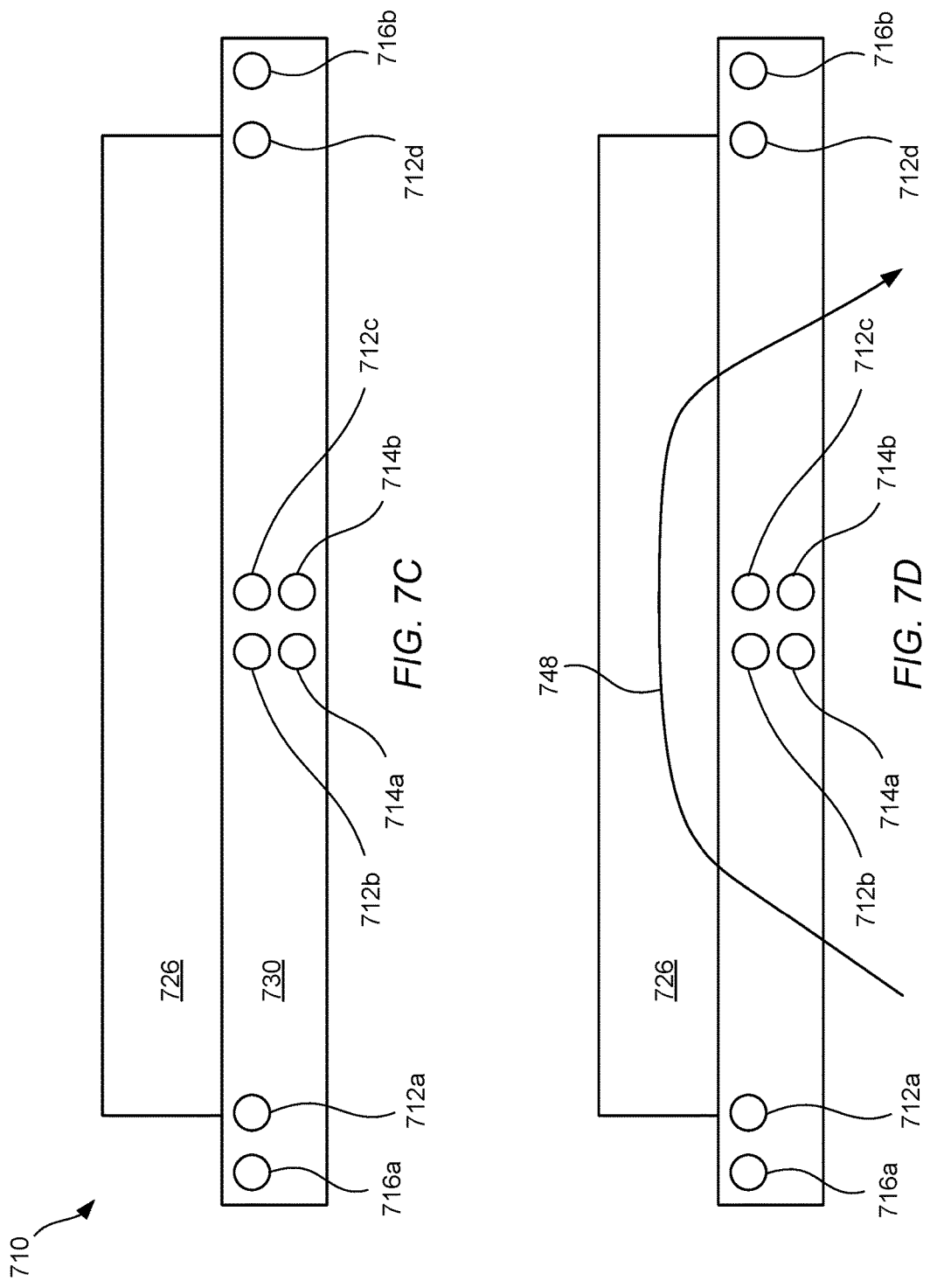

WIRELESS CHARGING RETAIL SYSTEMS

CROSS REFERENCE TO RELATED APPLICATIONS

The present application claims the benefit of U.S. Provisional Application No. 62/180,553, filed Jun. 16, 2015, which is hereby incorporated by reference for all purposes.

BACKGROUND

Electronic devices (e.g., mobile phones, media players, electronic watches, and the like) operate when there is charge stored in their batteries. Batteries charge when the electronic device is coupled to a power source, such as via a charging cord. Using charging cords to charge batteries in electronic devices, however, requires the electronic device to be physically tethered to a power outlet. In areas where there are many devices that are charging, there may be a large, disorganized grouping of cables that could easily get tangled. Additionally, using charging cords requires the mobile device to have a receptacle configured to mate with the charging cord. The receptacle is typically a cavity in the electronic device that provides avenues within which dust and moisture can intrude and damage the device. Furthermore, a user of the electronic device has to physically connect the charging cable to the receptacle in order to charge the battery.

To avoid such shortcomings, wireless charging stations have been developed to wirelessly charge electronic devices. Electronic devices may charge by merely resting on a charging surface of the charging station. Magnetic fields generated by transmitters disposed below the charging surface may induce corresponding currents in receivers that have a corresponding inductive coil. The induced currents may be used by the electronic device to charge an internal battery.

Existing wireless charging systems have a number of disadvantages. For instance, wireless charging surfaces require a specific charging region disposed on top of a transmitter coil embedded beneath the surface. This requires the electronic device to be placed in a very specific area on the charging surface. If an electronic device is placed outside of the charging region, the electronic device may not wirelessly charge due to the absence of a magnetic field. Additionally, since single axis magnetic fields require transmitter and receiver coils to be disposed on parallel planes, the electronic device must be positioned in a particular orientation (e.g., with the back face of the device resting on the surface) in order for charging to occur.

SUMMARY

Embodiments provide transmitters, receivers, and systems for wireless charging. Embodiments further provide methods of making receivers and methods of wireless charging.

In some embodiments, an array of transmitter coils can be disposed below a charging surface. The array of transmitter coils may generate time-varying magnetic fields across a vast majority of the charging surface. The magnetic fields can provide power to a dock (or electronic device) located at virtually any position of the surface and in any orientation by inducing current in a multi-dimensional receiver coil of the dock (or electronic device).

In some embodiments, a wireless charging transmitter includes a coil configured to transmit power. The coil may include a first loop portion, a second loop portion, and a crossing portion. The crossing portion may include overlapping conductive paths electrically coupling the first loop portion and the second loop portion. The first and second loop portions may be electrically coupled such that, when an electrical current is generated in the coil, the electrical current flows through the first loop portion in a first rotational direction, and through the second loop portion in a second rotational direction different than the first rotational direction.

In some embodiments, a wireless charging transmitter includes: a coil configured to transmit power, the coil including a first loop portion; a second loop portion; and a crossing portion comprising overlapping conductive paths that electrically couple the first loop portion and the second loop portion such that, when an electrical current is generated in the coil, the electrical current flows through the first loop portion in a first rotational direction and through the second loop portion in a second rotational direction opposite the first rotational direction.

The first loop portion and the second loop portion may be characterized by substantially the same shape and dimensions. In certain embodiments, when the electrical current is generated in the coil a first magnetic field may be generated by the electrical current flowing through the first loop portion, the first magnetic field being characterized by a first direction; and a second magnetic field may be generated by the electrical current flowing through the second loop portion, the second magnetic field being characterized by a second direction different than the first direction. An angle formed between the first direction and the second direction may be at least 135 degrees. In some embodiments, the first direction and the second direction may extend in opposite directions. The crossing portion may be a first crossing portion, and wherein the transmitter may further include a second coil configured to transmit power, the second coil including: a third loop portion; a fourth loop portion; and a second crossing portion comprising overlapping conductive paths that electrically couple the third loop portion and the fourth loop portion such that, when an electrical current is generated in the second coil, the electrical current flows through the third loop portion in the first rotational direction and through the fourth loop portion in the second rotational direction. When the electrical current is generated in the first coil and the second coil, a bridging magnetic field may be generated in a region between the first coil and the second coil. In certain embodiments, the bridging magnetic field may bend between the second loop portion and the third loop portion. The bridging magnetic field may bend in an orientation from the second loop portion to the third loop portion. In particular embodiments, the bridging magnetic field may bend in an orientation from the third loop portion to the second loop portion. The second coil may overlap at least a portion of the first coil. In some embodiments, the first loop portion may have a first horizontal part and a first vertical part, and the second loop portion may have a second horizontal part and a second vertical part. The first horizontal part may extend above the second vertical part, and wherein the second horizontal part extends below the first vertical part.

In some embodiments, a wireless charging receiver includes: a first coil disposed relative to a first axis; a second coil disposed relative to a second axis, the second axis extending in a direction different than the first axis; and a ferromagnetic structure positioned adjacent to the first coil and the second coil.

The wireless charging receiver may further include a third coil disposed relative to a third axis, the third axis may extend in a direction different than the first axis and the second axis. The second axis may extend in a direction between 45 to 135 degrees from the first axis, and the third may extend in a direction between 45 to 135 degrees from the first axis and the second axis. In some embodiments, the second axis may be perpendicular to the first axis, and the third axis may be perpendicular to the first axis and the second axis. The first coil may be disposed around the ferromagnetic structure, and the second coil may be disposed around the ferromagnetic structure and the first coil. In some embodiments, the third coil may be disposed around the ferromagnetic structure, the first coil, and the second coil. The wireless charging receiver may further include a first insulating layer disposed between the ferromagnetic structure and the first coil, a second insulating layer disposed between the first coil and the second coil, and a third insulating layer disposed between the second coil and the third coil. The first coil may be disposed along the first axis, and the second coil may be disposed along the second axis. In some embodiments, both the first coil and the second coil each comprise a two loop portions. The ferromagnetic structure may be a shielding disk positioned above the first coil and the second coil.

In particular embodiments, a method of fabricating a wireless charging receiver includes: providing a ferromagnetic structure; forming a first insulating layer around the ferromagnetic structure; forming a first coil on the first insulating layer, the first coil being disposed about a first axis of the ferromagnetic structure; forming a second insulating layer on the first coil and exposed surfaces of the first insulating layer; forming a second coil on the second insulating layer, the second coil being disposed about a second axis of the ferromagnetic structure, and the second axis being substantially perpendicular to the first axis; forming a third insulating layer on the second coil and exposed surfaces of the second insulating layer; and forming a third coil on the third insulating layer, the third coil being disposed about a third axis of the ferromagnetic structure, and the third axis being substantially perpendicular to the first axis and the second axis.

In certain embodiments, forming the first coil, the second coil, and the third coil each includes depositing a patterned layer of conductive material. The first insulating layer may be formed by fusing a first set of two halves together over the ferromagnetic structure, where the second insulating layer may be formed by fusing a second set of two halves together over the first insulating layer and the first coil, and where the third insulating layer may be formed by fusing a third set of two halves together over the second insulating layer and the second coil.

In some embodiments, a wireless charging system includes: a transmitter assembly comprising: a charging surface; and a plurality of transmitter coils disposed below the charging surface. The plurality of coils include first and second transmitter coils configured to transmit power, the first coil generating first and second magnetic fields and the second coil generating third and fourth magnetic fields when driven with electrical current, the first and second transmitter coils forming a bridging magnetic field disposed between the first and second transmitter coils; and a receiver assembly. The receiver assembly includes: a first coil disposed relative to a first axis; a second coil disposed relative to a second axis, the second axis extending in a direction different than the first axis; and a ferromagnetic structure positioned adjacent to the first coil and the second coil.

The wireless charging system may further include a third receiver coil disposed relative to a third axis, the third axis being substantially perpendicular to the first axis and the second axis. The charging surface may be substantially planar. The charging surface may include curved regions. In certain embodiments, the bridging magnetic field may bend between the second and third magnetic fields. A fifth magnetic field may bridge between two loop portions of the first transmitter coil, and a sixth magnetic field may bridge between two loop portions of the second coil. Each transmitter coil may have a length and a width, where the length may be correlated with a dimension of the charging surface. The length may be twice the width.

In some embodiments, a wireless charging table includes: a table top having an upper surface upon which one or more electronic devices can be placed; a wireless charging transmitter positioned under the upper surface of the table top, the wireless charging transmitter comprising a plurality of transmitter coils that define a charging region at the upper surface of the table top, the plurality of transmitter coils including at least a first transmitter coil including: a first loop portion; a second loop portion; and a crossing portion comprising overlapping conductive paths that electrically couple the first loop portion and the second loop portion such that, when an electrical current may be generated in the first transmitter coil, the electrical current flows through the first loop portion in a first rotational direction, and through the second loop portion in a second rotational direction opposite the first rotational direction; and a power distribution system operatively coupled to the wireless charging transmitter, the power distribution system configured to receive power from an alternating current (AC) power source and distribute power to the wireless charging transmitter.

When the electrical current may be generated in the first transmitter coil: a first magnetic field may be generated by the current flowing through the first loop portion, the first magnetic field being characterized by a first direction; and a second magnetic field may be generated by the current flowing through the second loop portion, the second magnetic field being characterized by a second direction different than the first direction. In certain embodiments, an angle formed between the first direction and the second direction may be at least 135 degrees. The crossing portion may be a first crossing portion, and where the plurality of transmitter coils further includes a second coil configured to transmit power, the second coil includes: a third loop portion; a fourth loop portion; and a second crossing portion comprising overlapping conductive paths that electrically couple the third loop portion and the fourth loop portion such that, when an electrical current may be generated in the second coil, the electrical current flows: through the third loop portion in the first rotational direction; and through the fourth loop portion in the second rotational direction. When the electrical current is generated in the first transmitter coil and the second coil, a bridging magnetic field may be generated in a region between the first transmitter coil and the second coil. The bridging magnetic field may bend between the second loop portion and the third loop portion. In some embodiments, the first loop portion may have a first horizontal part and a first vertical part, and the second loop portion may have a second horizontal part and a second vertical part. The first horizontal part may extend above the second vertical part, and the second horizontal part may extend below the first vertical part. The power distribution system may include a controller configured to communicate with an electronic device of the one or more electronic devices.

In some embodiments, a wireless charging receiver for interacting with a wireless charging retail table includes: a first coil disposed relative to a first axis; a second coil disposed relative to a second axis, the second axis extending in a direction different than the first axis; and a ferromagnetic structure positioned adjacent to the first coil and the second coil, where the first coil, the second coil, and the ferromagnetic structure are configured to receive magnetic fields generated by a transmitter for the wireless charging retail table.

The wireless charging receiver may be encased within a docking station. The docking station may be configured to rest on a charging surface of the wireless charging retail table. The docking station may be configured to connect to an electronic device to provide power to the electronic device. The wireless charging receiver may further include a third coil disposed relative to a third axis, the third axis extending in a direction different than the first axis and the second axis. The second axis may extend in a direction between 45 to 135 degrees from the first axis, and the third axis may extend in a direction between 45 to 135 degrees from the first axis and the second axis. The second axis may be perpendicular to the first axis, and the third axis may be perpendicular to the first axis and the second axis.

In some embodiments, a wireless charging system includes: a table top having an upper surface upon which one or more electronic devices can be placed; a wireless charging transmitter positioned under the upper surface of the table top, the wireless charging transmitter comprising a plurality of transmitter coils that define a charging region at the upper surface of the table top, the plurality of transmitter coils including at least a first transmitter coil includes: a first loop portion; a second loop portion; and a crossing portion comprising overlapping conductive paths that electrically couple the first loop portion and the second loop portion such that, when an electrical current is generated in the first transmitter coil, the electrical current flows through the first loop portion in a first rotational direction, and through the second loop portion in a second rotational direction opposite the first rotational direction; and a power distribution system operatively coupled to the wireless charging transmitter, the power distribution system may be configured to receive power from an alternating current (AC) power source and distribute power to the wireless charging transmitter. The wireless charging system also includes a wireless charging receiver including: a first coil disposed relative to a first axis; a second coil disposed relative to a second axis, the second axis extending in a direction different than the first axis; and a ferromagnetic structure positioned adjacent to the first coil and the second coil, where the first coil, the second coil, and the ferromagnetic structure are configured to receive magnetic fields generated by the plurality of transmitter coils.

The wireless charging system may also include a plurality of sensors configured to detect a presence of an electronic device. The power distribution system may include a controller coupled to the plurality of sensors and the plurality of transmitter coils. The controller may be configured to selectively energize one or more transmitter coils in response to the detected presence of the electronic device. The wireless charging receiver may be encased within a docking station.

A better understanding of the nature and advantages of embodiments of the present disclosure may be gained with reference to the following detailed description and the accompanying drawings.

BRIEF DESCRIPTION OF THE DRAWINGS

FIG. 7C is a simplified diagram illustrating a cross-sectional view of a receiver including coils having loop portions and a shielding disk, in accordance with embodiments of the present disclosure.

FIG. 7D is a simplified diagram illustrating a cross-sectional view of a magnetic field propagating through a receiver including coils having loop portions and a shielding disk, in accordance with embodiments of the present disclosure.

DETAILED DESCRIPTION

Embodiments describe a wireless charging system where an electronic device may be charged across a vast majority, if not an entire area, of a charging surface. An array of transmitter coils disposed below a charging surface may generate time-varying magnetic fields capable of inducing current in a receiver of the electronic device or of a docking station with which the electronic device is coupled. In certain embodiments, each transmitter coil can generate magnetic fields in different directions simultaneously. For instance, each transmitter coil can generate two magnetic fields in opposite directions. Portions of transmitter coils may also interact with one another such that magnetic fields generated in one portion of a coil can bend into another portion of the same coil.

In some embodiments, magnetic fields generated by each transmitter may also bridge between transmitter coils. For instance, magnetic fields generated by current traveling through a portion of one transmitter coil may bend into a portion of another adjacent transmitter coil. Accordingly, magnetic fields may be formed between transmitter coils such that magnetic fields are present across an entire charging surface including an array of embedded transmitter coils with little or no drop-off in field strength above regions in between adjacent coils.

In some embodiments, the receiver can include coils in which current is induced when in the presence of the magnetic fields generated by the array of transmitters to generate current for charging electronic devices. Specifically, in some embodiments, the receiver may be configured to utilize the magnetic fields generated by individual transmitter coils in addition to magnetic fields flowing between adjacent transmitter coils to generate current for charging electronic devices. Details of such a wireless charging system is discussed in further detail herein.

I. Wireless Charging Station

Figure 1:
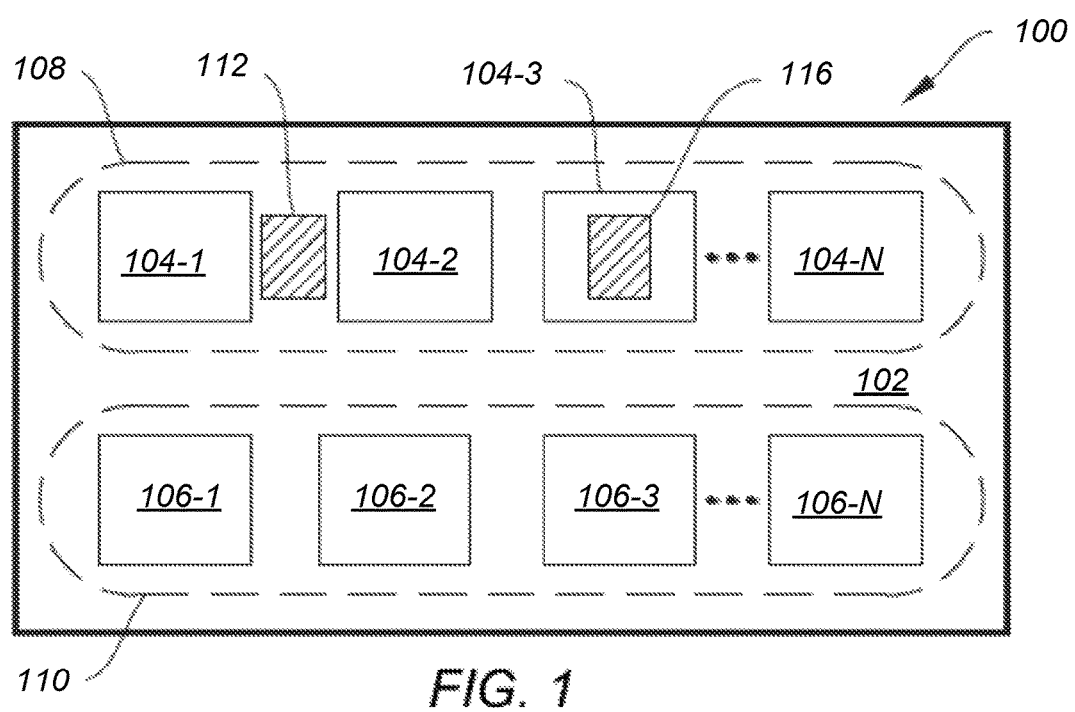
FIG. 1 is a simplified diagram illustrating a wireless charging station, in accordance with embodiments of the present disclosure.

FIG. 1 illustrates an exemplary wireless charging station 100 in accordance with some embodiments of the present disclosure. Wireless charging station 100 includes a charging surface 102. Charging surface 102 may be a surface upon which a device having a receiver may rest to wirelessly charge its battery. In some embodiments, charging surface 102 may be a top surface of a charging structure (e.g., a table having charging surface 102 and a plurality of legs supporting charging surface 102) that is substantially planar. In other embodiments, charging surface 102 may include curvature such that regions of charging surface 102 are substantially non-planar. The curvature may be convex or concave, or may include multiple convex and concave profiles organized in a predetermined or random arrangement.

In some embodiments, wireless charging station 100 also includes sets of transmitters 104 and 106. Sets of transmitters 104 and 106 may each include a plurality of coils. For instance, sets of transmitters 104 and 106 may each contain N number of coils as illustrated in FIG. 1. The number N may be any suitable number capable of allowing the set of transmitters to generate magnetic fields across a vast majority, if not the entire area, of charging surface 102. In embodiments, sets of transmitters 104 and 106 may be disposed underneath charging surface 102 and embedded within charging station 100. Although embodiments discuss two sets of transmitters 104 and 106, other embodiments are not limited to such arrangements. For instance, embodiments may be formed of more or less than two sets of transmitters.

In certain embodiments, sets of transmitters 104 and 106 may have identical coil arrangements. In other embodiments, sets of transmitters 104 and 106 may have different coil arrangements. For instance, set of transmitters 104 may have more or less coils than set of transmitters 106. Furthermore, set of transmitters 104 may have a different coil arrangement (e.g., perpendicular or parallel arrangements) than set of transmitters 106, as will be discussed further herein with respect to FIGS. 3A and 3B.

Magnetic fields may be generated by each of the coils in sets of transmitters 104 and 106 when a time-varying current is generated in the coils. For instance, each coil may be configured to generate a time-varying magnetic field when an AC current is generated in the coil. In some embodiments, the aggregate time-varying magnetic fields generated by the sets of transmitters 104 and 106 at charging surface 102 may create charging regions 108 and 80 that span across a vast majority of charging surface 102. For instance, in some embodiments, charging regions 108 and 80 may occupy 50% to 100% of the total surface area of charging surface 102. In FIG. 1, a gap is shown between charging regions 108 and 80. This, however, is not intended to be limiting. In some embodiments, magnetic fields generated by set of transmitters 104 and set of transmitters 106 can overlap (or even travel between each set) at charging surface 102.

Wireless charging can occur when a receiver is placed on or near charging surface 102. The receiver may be disposed within a receiving device 112, such as an electronic device that can be charged directly by the receiver or a docking station that can use energy received by the receiver to charge another electronic device operatively coupled to the docking station. For example, if the receiver is disposed within a docking station, an electronic device to be charged may be operatively coupled to the docking station by a physical connector through which charge from the docking station can be transferred to the electronic device. In some embodiments, an electronic device may receive power from the docking station via a second, separate inductive charging system. That is, the docking station can include both a first receiver to wirelessly receive energy from one or more of transmitters 104, 106 and a docking station wireless transmitter that wireless transmits energy from the docking station to a second receiver in the electronic device.

When receiving device 112 is placed on charging surface 102, time-varying magnetic fields generated by one or more coils in the sets of transmitters 104 and 106 may induce a current in the receiver disposed within the receiving device 112. The induced current may then be rectified by the receiving device 112 to generate DC power and charge a battery. Due to the continuous magnetic fields generated across charging surface 102, receiving device 112 can generate power when placed on virtually any region the charging surface 102. Unlike conventional wireless charging arrangements, receiving device 112 can generate power even when it is located between coils, such as between coils 104-1 and 104-2, due to magnetic fields traveling between coils. In embodiments, another receiving device 116 may also generate power when placed above a coil, such as coil 104-3, because magnetic fields generated by coil 104-3 may exist there as well. Additionally, the receiver of receiving device 112 can be configured to receive power in the form of magnetic fields generated in virtually any direction, thereby allowing receiving device 112 to be placed on charging surface in many different orientations. Details of the transmitter and receiver design that can facilitate such charging capabilities will be discussed further herein.

II. Transmitter

In embodiments of the present disclosure, a "transmitter" may include a coil of wire that generates a magnetic field when current is generated in the coil. The direction of the magnetic field may depend on the rotational direction of the current flowing through the coil (e.g., clockwise or counter-clockwise). For instance, according to the right hand rule (RHR), a counter-clockwise flow of current will generate an upward magnetic field inside the coil. Conversely, a clockwise flow of current will generate a downward magnetic field inside the coil. The shape and configuration of the coil may directly affect the characteristics of the magnetic field generated by the transmitter.

A. Transmitter Coil Structure

Figure 2A:
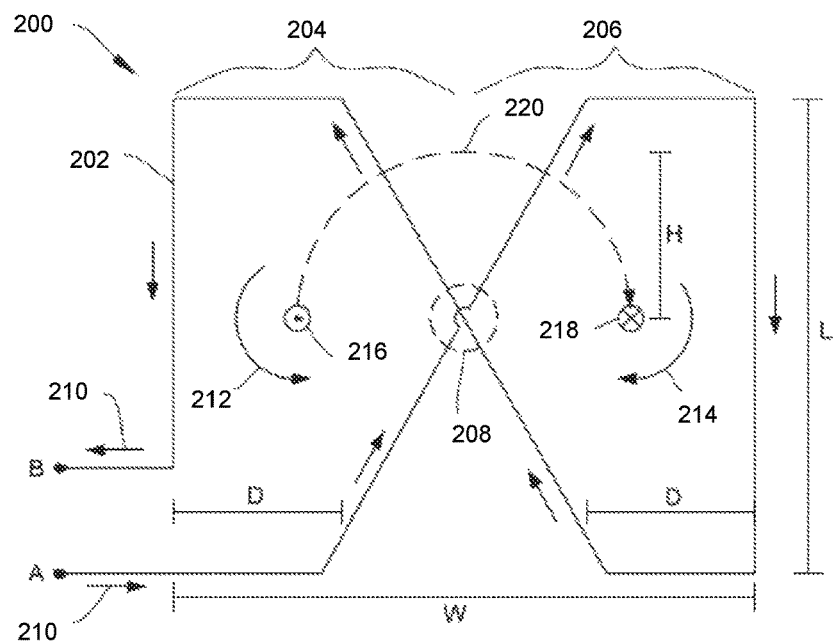
FIG. 2A is a simplified diagram illustrating a transmitter coil in accordance with some embodiments of the present disclosure.

FIG. 2A is a simplified diagram illustrating an exemplary transmitter 200, according to embodiments of the present disclosure. Transmitter 200 may be used in the sets of transmitters 104 and 106 discussed herein with respect to FIG. 1. Transmitter 200 may be formed of a coil 202 that crosses over itself to form multiple loop portions. For instance, coil 202 may form two loop portions: a first loop portion 204 and a second loop portion 206. First and second loop portions 204 and 206 may be substantially similar in size and shape. In some embodiments, first and second loop portions 204 and 206 may be mirror images of one another. In some embodiments, coil 202 may comprise one turn (e.g., as seen in FIG. 2A). In some other embodiments, coil 202 may have more than one turns with each turn comprising a first and second loop portion.

In some embodiments, first and second loop portions 204 and 206 may be electrically coupled together by a crossing portion 208. Crossing portion 208 may be a point at which coil 202 overlaps itself such that current flowing through first loop portion 204 may continue to flow through second loop portion 206. Accordingly, a single current may flow from node A to node B through coil 202, as illustrated in FIG. 2A. In some embodiments, overlapping wire portions at crossing portion 208 may be insulated from one another to minimize interference and/or prevent occurrence of short circuiting. For instance, coil 202 may be an insulated wire, or a patterned wire insulated by an insulating layer disposed between the crossing portion 208.

As a current 210 is driven through transmitter 200, magnetic fields may be generated by coil 202. As an example, magnetic fields 216 and 218 may be generated by transmitter 200 as current 210 is driven through coil 202. Magnetic fields 216 and 218 may be generated in a direction according to the direction of current flow around coil 202 as established by the RHR. In some embodiments, the rotational direction of current flow around second loop portion 206 may be opposite the rotational direction of the same current flow around first loop portion 204. For instance, nodes A and B can be connected to a power source, and as shown in FIG. 2A current 210 may flow into the coil 202 from node A, across crossing portion 208, around second loop portion 206, across crossing portion 208 again, around first loop portion 204, and out of the coil at node B. Thus, a counter-clockwise current flow 212 may be formed in first loop portion 204, and a clockwise current flow 214 may be formed in second loop portion 206. When the bias of the power source is reversed, current can flow through the coil 202 in the opposite direction, thereby creating a clockwise current flow in first loop portion 204 and a counter-clockwise current flow in second loop portion 206.

As a result of the current flow, first magnetic field 216 may be generated within first loop portion 204, and second magnetic field 218 may be generated in second loop portion 206. In some embodiments, first magnetic field 216 is generated in a direction different than second magnetic field 218. As an example, according to the RHR, when the applied bias generates current 210 shown in FIG. 2A, first magnetic field 216 may be generated in a direction out of the page (as indicated by a circle with a dot in the center) due to counter-clockwise current flow 212, and second magnetic field 218 may be generated in a direction into the page (as indicated by a circle with an "X" in the center) due to clockwise current flow 214. When the bias applied by the power source is reversed, the change in current direction may generate magnetic fields in opposite directions as described herein.

In some embodiments, first magnetic field 216 and second magnetic field 218 may be generated in completely opposite directions. Thus, an angle between first and second magnetic fields 216 and 218 may be approximately 180 degrees. However, in some embodiments, first and second magnetic fields 216 and 218 may not be generated in completely opposite directions. This may be because the transmitter 200 is not completely flat as a result of manufacturing variations. In such embodiments, an angle between first and second magnetic fields 216 and 218 may be more or less than 180 degrees. In some embodiments, the angle between first and second magnetic fields 216 and 218 may be at least 135 degrees. In some other embodiments, the angle between first and second magnetic fields 216 and 218 may be between 175 and 185 degrees.

Portions of first magnetic field 216 may bridge across transmitter 200. For instance, as shown in FIG. 2A, bridging field 220 of first magnetic field 216 may bend across crossing portion 208 and down into the region of second magnetic field 218 as a result of the opposite polarity of magnetic fields 216 and 218. In some embodiments, bridging field 220 may extend a distance H away from transmitter 200. Distance H may be set according to the distance between transmitter 200 and a charging surface disposed above transmitter 200. Distance H may be tall enough to project above the charging surface such that a receiver on the surface can be within the generated magnetic fields.

In some embodiments, distance H may be altered by changing a distance D of the first and second loop portions 204 and 206. Distance D may represent the horizontal spacing between edges of a loop portion, such as loop portions 204 and 206. A greater distance D can result in a magnetic field that projects farther away (e.g., greater distance H). Conversely, a lesser distance D can result in a magnetic field that projects closer to transmitter 200 (e.g., lesser distance H). Accordingly, distance D may be designed according to a target distance H, which may be determined based upon the distance between transmitter 200 and the charging surface. The target distance H may be directly related to the thickness of a charging surface. For instance, thicker charging surfaces may require greater distances D. In certain embodiments where, for example, the charging surface is part of a relatively thick upper surface (e.g., between one half inch and two inches thick) of a charging table sized and shaped to simultaneously charge multiple devices, distance D can range between 1 and 12 inches. In a particular embodiment, distance D can be approximately 3 inches for a charging surface approximately 1 inch thick.

As further illustrated in FIG. 2A, embodiments of transmitter 200 may have a bow tie shape. That is, portions of first and second loop portions 204 and 206 may taper toward crossing portion 208. Additionally, other portions of first and second loop portions 204 and 206 may have a straight-edged profile with relatively sharp corners. In some embodiments, transmitter 200 may have an overall length L and an overall width W. In certain embodiments, transmitter 200 may have a length ranging between 1 and 24 inches, such as approximately 6 inches. Overall width W for transmitter 200 may range between 1 and 12 inches, such as approximately 12 inches. In an embodiment, transmitter 200 may have a square-shape profile where the length L and width W are equal. In another embodiment, transmitter 200 may have a rectangular-shape profile where the length L is different than width W. For example, transmitter 200 may have a length L that is twice its width W.

Although FIG. 2A illustrates an exemplary transmitter having a bow tie profile, other profiles are envisioned herein as well. For instance, other embodiments may have curved-edge profiles and/or curved corners. In some embodiments, a transmitter structure may have loop portions that have a bent profile, e.g., L-shaped loop portions, as shown in FIG. 2B.

Figure 2B:
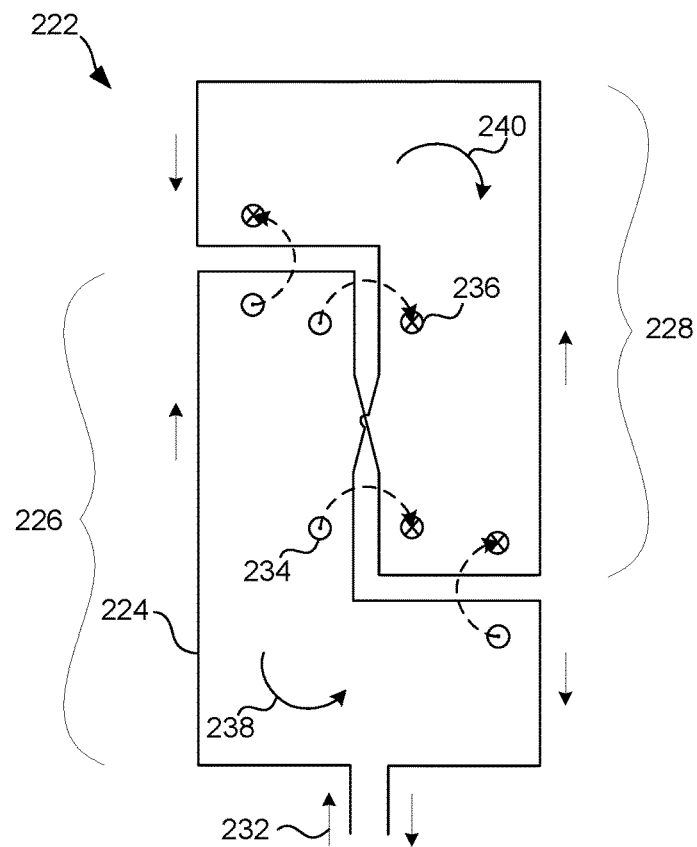
FIG. 2B is a simplified diagram illustrating a transmitter coil in accordance with embodiments of the present disclosure.

FIG. 2B illustrates an exemplary transmitter 222 having loops configured in a bent, L-shaped profile, according to an embodiment of the present disclosure. Similar to transmitter 200, transmitter 222 may be formed of a coil 224 that crosses over itself to form multiple loop portions, e.g., two loop portions: a first loop portion 226 and a second loop portion 228. First and second loop portions 226 and 228 are electrically coupled together by a crossing portion 530, which may be a point at which transmitter 222 overlaps itself such that current flowing through first loop portion 226 may continue to flow through second loop portion 228.

As a current 532 is driven through transmitter 222, magnetic fields may be generated by transmitter 222. As an example, first and second magnetic fields 534 and 536 may be generated by transmitter 222 as current 532 is driven through coil 224. According to the RHR, when the applied bias generates current 532 shown in FIG. 2B, first magnetic field 534 may be generated in a direction out of the page due to counter-clockwise current flow 538, and second magnetic field 536 may be generated in a direction into the page due to clockwise current flow 540.

As shown in FIG. 2B, first and second loop portions 226 and 228 have bent profiles. Accordingly, a horizontal part of first loop portion 226 may extend over a vertical part of second loop portion 228 as shown in FIG. 2B, and vice versa. Having the horizontal part of first loop portion 226 extend over the vertical part of second loop portion 228 causes the left and right edges of transmitter 222 to include parts of first and second loop portions 226 and 228. Thus, each of the left and right edges of transmitter 222 may generate magnetic fields that extend in opposite directions. The opposite polarity of the magnetic fields minimizes detrimental coupling between neighboring transmitter coils, as will be discussed further herein.

Similar to transmitter 200 in FIG. 2A, transmitter 222 may also have an overall length L, an overall width W, and a distance D. In some embodiments, the dimensions of each transmitter 222 can be related to the dimensions of a charging surface. For instance, in an embodiment where a charging surface has a length that is two times greater than its width, a transmitter 222 can have a length L that is also two times larger than its width. Furthermore, the thickness of the charging surface may dictate distance D of transmitter 222. A larger distance D may result in a magnetic field projecting a greater distance H away from transmitter 222. Thus, transmitter 222 may have a distance D ranging between 1-12 inches for a charging surface approximately 1 inch thick. In a particular embodiment, the distance D is approximately 3 inches. Accordingly, transmitter 222 may project a magnetic field above a charging surface such that receivers may interact with the magnetic field.

B. Transmitter Arrangement

According to some embodiments, a transmitter having more than one coil may be used to generate magnetic fields at a charging surface, such as charging surface 102 in FIG. 1. For instance, more than one coil may be placed proximate to one another such that a magnetic fields exists between the coils.

Figure 3A:
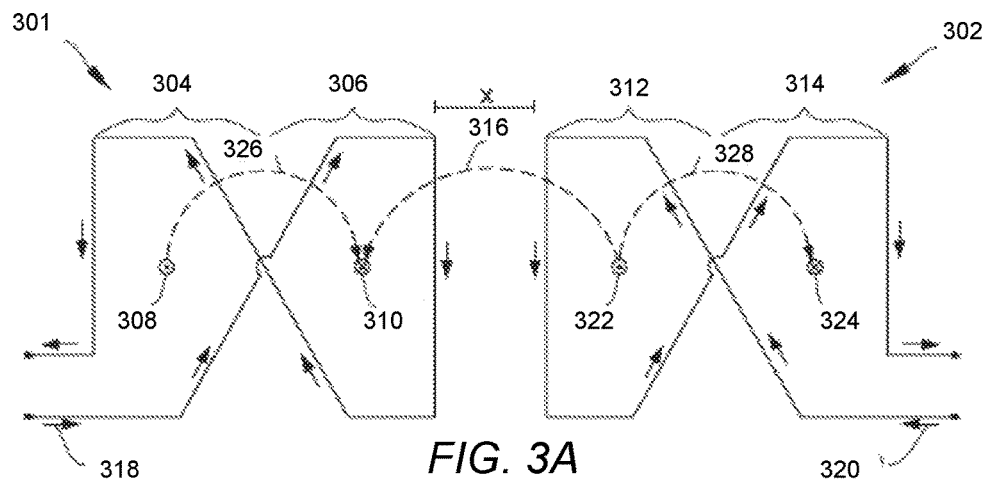
FIG. 3A is a simplified diagram illustrating a pair of transmitter coils according to FIG. 2A arranged in a parallel configuration, in accordance with embodiments of the present disclosure.

FIG. 3A illustrates an exemplary transmitter arrangement where two coils having bow tie profiles are arranged proximate to one another. As shown, a first coil 301 may be disposed laterally proximate to a second coil 302 such that both coils are arranged parallel to one another. First coil 301 may include a first loop portion 304 and second loop portion 306. Current 318 flowing through first coil 301 may generate a first magnetic field 308 and a second magnetic field 310. A portion 326 of magnetic field 308 may bridge between first and second loop portions 304 and 306. Second coil 302 may include a third loop portion 312 and fourth loop portion 314. Current 320 flowing through second coil 302 may generate a third magnetic field 322 and a fourth magnetic field 324. In some embodiments, the rotational flow of the current through third loop portion 312 may be the same as the rotational flow of the current through first loop portion 304. Accordingly, a portion 328 of the magnetic field 322 may bridge between third and fourth loop portions 312 and 314.

In some embodiments, the direction of the magnetic fields generated by loop portions in adjacent coils may be opposite one another. For example, magnetic field 310 generated by second loop portion 306 may be in an opposite direction to magnetic field 322 generated by third loop portion 312. Due to their opposite polarities, a portion 316 of magnetic field 322 may bridge between coils 301 and 302 and bend downward into the second loop portion 306. Accordingly, a magnetic field may exist in a space X between adjacent coils 301 and 302. In some embodiments, a receiver may generate power when placed on a region of a charging surface above a space between coils as well as above the center of a coil, as will be discussed further herein.

Figure 3B:
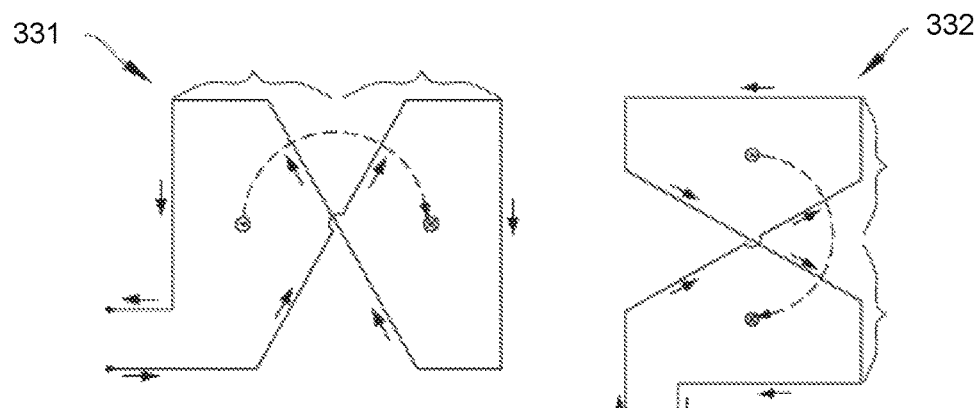
FIG. 3B is a simplified diagram illustrating a pair of transmitter coils according to FIG. 2A arranged in a perpendicular configuration, in accordance with embodiments of the present disclosure.

In some embodiments, as shown in FIG. 3A, adjacent coils can be arranged in a parallel configuration. In some other embodiments, adjacent coils can be arranged in a perpendicular configuration. FIG. 3B illustrates such a transmitter arrangement where two coils are arranged perpendicular to one another. As shown, a second coil 332 is arranged at an angle offset from a first coil 331 of approximately 60 degrees. By placing the two coils perpendicular to one another, undesirable coupling effects between adjacent coils can be alleviated in some embodiments. Additionally, coils 331 and 332 may be arranged to have different geometries to minimize coupling. In embodiments where there are more than two coils, the transmitter arrangement may include an alternating geometry arrangement between two different coil geometries. Other embodiments may minimize coupling by isolating resonant components. Isolating resonant components may be performed by turning off those components that resonate with one another.

Although modifying the transmitter arrangement may decrease coupling between transmitters, other modifications may be performed instead. For instance, modifying the profile of the loop portions may minimize detrimental coupling. In an embodiment, transmitter coils may be modified to have bent L-shaped loop profiles (i.e., profile in FIG. 2B) to minimize detrimental coupling, as will be discussed herein with respect to FIG. 4.

Figure 4:
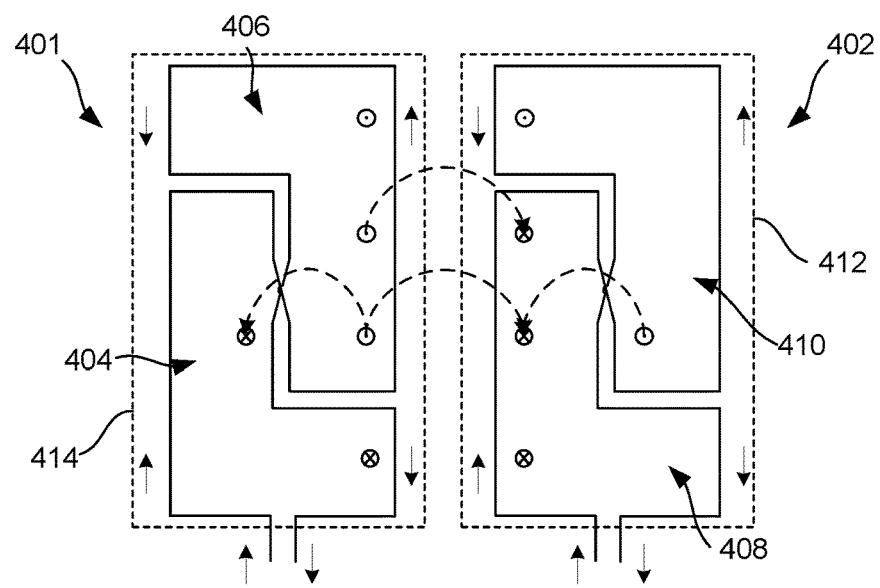
FIG. 4 is a simplified diagram illustrating a pair of transmitter coils according to FIG. 2B arranged in a parallel configuration, in accordance with embodiments of the present disclosure.

FIG. 4 illustrates an exemplary transmitter arrangement where two coils having bent L-shaped loop profiles are arranged proximate to one another. As shown, a first coil 401 may be disposed laterally proximate to a second coil 402 such that both coils are arranged parallel to one another. First coil 401 may include a first loop portion 404 and a second loop portion 406; and second coil 402 may include a first loop portion 408 and a second loop portion 410. As shown in FIG. 4, only those parts of second loop portion 406 of first coil 401 that are laterally adjacent to parts of first loop portion 408 of second coil 402 may interact with one another. Thus, less than the entire edge of coils 401 and 402 may interact with one another. In some embodiments, approximately half of the entire edges of coils 401 and 402 may interact with one another. Due to the decreased interaction between first and second coils 401 and 402, detrimental coupling may be less than other instances where the entire edges of first and second coils are interacting with one another (e.g., coils in FIG. 3A), thereby minimizing coupling between first and second coils 401 and 402.

Although FIGS. 3A, 3B, and 4 illustrate first/second coils 301/631, 302/632, and 701/702 as being substantially identical, embodiments are not so limited. For instance, first and second coils may have different cross-sectional shapes and/or have different sizes. Thus, in some embodiments, first and second coils may have different orientations and also have different shapes. Furthermore, although FIGS. 3A, 3B, and 4 illustrate first and second coils 301, 331 and 302, 332 being adjacent to one another, one skilled in the art will understand that a transmitter may have more than two coils. Thus, first and second coils may not be adjacent to one another, but be far away from one another with one or more intermediate coils disposed between them. Further, in some embodiments, transmitters may further include ferromagnetic material (e.g., ferrite sheet material) used to concentrate magnetic fields and direct them in accordance with selected geometry based upon the arrangement of the receiver described in further detail herein.

In yet other embodiments, a differential coil 412/414 may be disposed around the outside of each transmitter coil 401 and 402. Differential coil 412/414 may enhance the efficiency of magnetic field generation of each transmitter coil 401 and 402. Additionally, differential coil 412/714 may minimize far-field magnetic fields, but enhance near-field magnetic fields in relation to the z-direction (i.e., the direction into and out of the page) of transmitter coils 401 and 402. Thus, conductive entities that are far from the transmitter coils may not be exposed, or nominally exposed, to the magnetic fields generated by transmitter coils 401 and 402, while conductive entities that are close to the transmitter coils may be substantially exposed to the magnetic fields.

C. Transmitter Operation

Figure 5:
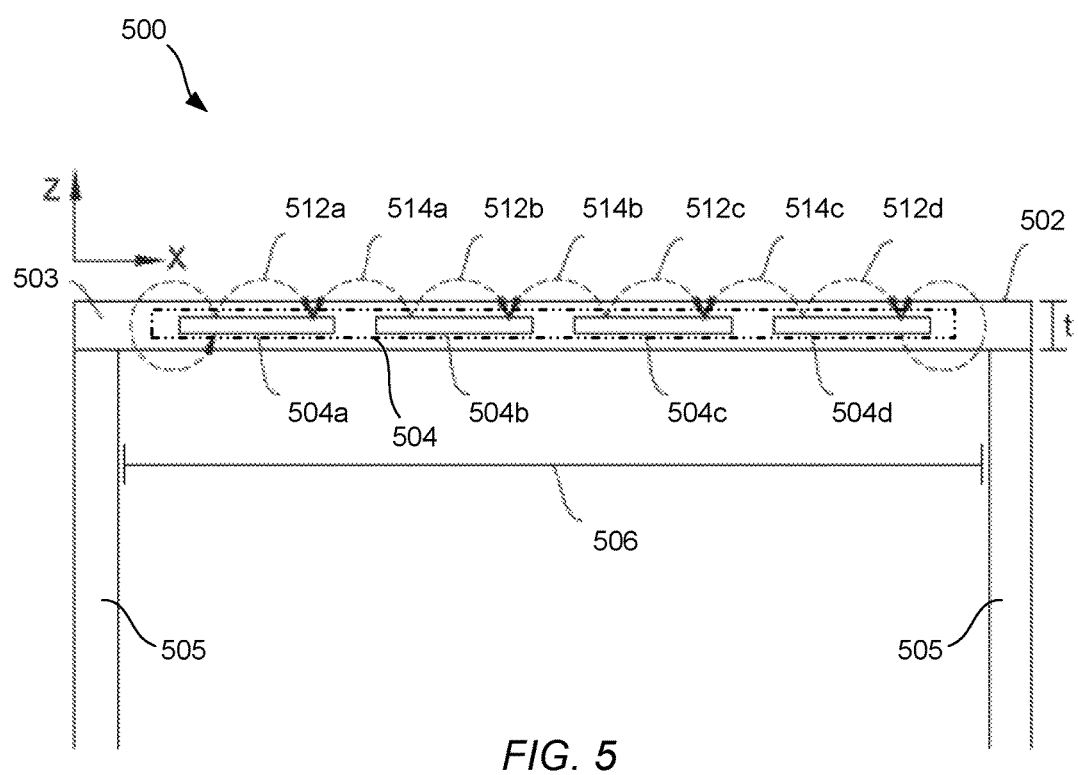
FIG. 5 is a simplified diagram illustrating a side-view cross-section of a wireless charging station, in accordance with embodiments of the present disclosure.

FIG. 5 illustrates a side-view cross-sectional perspective of a charging structure 500 that includes an upper charging surface 502 and a transmitter 504 having a plurality of transmitting coils 504a-504d according to some embodiments of the present disclosure. With reference to a three-dimensional space, Z and X directions of magnetic fields are observable in FIG. 5, while magnetic fields in the Y direction, although existing in the embodiment of FIG. 5, are not shown for ease of description. Charging structure 500 is illustrated in FIG. 5 as a table having a table top 503 supported by multiple legs 505. In some embodiments, the table can be located in a retail environment and used to display and charge multiple electronic devices for potential purchase. A charging width 506 across charging surface 502 can represent all of or less than the upper surface of table top 503 depending on the placement and number of individual transmitting coils included in transmitter 504. Additionally, in some embodiments, the dimensions of one or more individual transmitting coils, such as coils 504a-504d, are related to the dimensions of charging surface 502 as discussed above with respect to FIGS. 2A and 2B.

Although charging structure 500 is shown in FIG. 5 as a table having a charging surface 502 supported by a plurality of legs, it is to be appreciated that charging structure 500 can be any structure having a charging surface 502 upon which an electronic device may be placed. For example, in other embodiments, charging structure 500 can be a charging mat that is sized and shaped for personal use (e.g., to be placed on a desktop or similar surface). Additionally, while coils 504a-504d are shown in FIG. 5 as being embedded within table top 503 of charging structure 500, in other embodiments the coils can be placed below the table top or embedded in other portions of charging structure 503 (e.g., if charging structure 500 is a charging mat, coils 504a-504d can be embedded in the mat). In embodiments where coils 504a-504b are placed below table top 503, table top 503 may include an apron (not shown) that surrounds the edges of table top 503 that extend far enough down such that coils 504a-504b are hidden from view. Additionally, coils 504a-504d may be embedded within a protective structure (not shown) that is attached to table top 503 having a single inlet to accept AC power. When current is driven to coils 504a-504d, magnetic fields 512 and 514 may be generated. Near-field may be maximized and far-field may be minimized to maximize the strength of magnetic fields at charging surface 502. As discussed herein, dimension D of the coils as discussed in FIG. 2A, can be designed to maximize magnetic fields in the near-field regions.

According to some embodiments of the disclosure, magnetic fields 512 generated over the transmitter 504, and magnetic fields 514 generated between transmitters 504 can form a charging width 506 that spans across a vast majority of the charging surface 502. Magnetic fields 512 and 514 can be generated such that at least a portion of magnetic fields 512 and 514 are detectable above charging surface 502 across charging width 506. Thus, unlike conventional charging regions, charging width 506 can be substantially continuous across the surface and allows an electronic device to be charged in areas of charging surface 502 where a coil is not disposed directly underneath, such as regions between coils 504a-504d.

In some embodiments, coils 504a-504d are coupled to a single power source. The power source may be an AC (or pulsed DC) voltage or current source that produces time-varying current. The time-varying current may thus generate time-varying magnetic fields 512 and 514. According to some embodiments of the present disclosure, a single power source signal may be provided to coils 504a-504d. Additionally, coils 504a-504d may all be driven by a same clock source such that coils 504a-504d operate at the same frequency in a single phase. Thus, in some embodiments, there may be no need to create multiple signals having different phases, as required in a phased-array system where multiple clock sources are used to drive current to an array of antennas. Accordingly, the arrangement of coils 504a-504d may result in a simpler magnetic field generation system. In some embodiments, a receiver having one or more coils may be configured to capture magnetic fields 512 and 514 generated by transmitters 504, with magnetic fields 512 and 514 inducing current in the receiver coils. Details of such receivers are discussed further herein.

In some embodiments, coils 504a-504d are coupled to more than one power source. Any coupling arrangement of coils 504a-504d and the power sources for suitable operation of the transmitter is envisioned in embodiments described herein. For instance, coils 504a-504b may be coupled to a first power source, and coils 504c-504d may be coupled to a second power source. The power sources may all have the same configurations and operate synchronously. Or, alternatively, the power sources may have different types of configurations and operate asynchronously. For instance, the first power source may provide a time-varying current at a different frequency than the second power source. As an example, the first and second power sources may operate at frequencies that are offset by one or more kHz from one another.

III. Receiver

In embodiments of the present disclosure, a "receiver" may be an electrical component including one or more coils of wire in which a current can be induced in the presence of a time-varying magnetic field. In some embodiments, a receiver can be incorporated directly into an electronic device which can use the induced current to charge a battery. In some embodiments, a receiver can be part of a docking station configured to transfer the generated power to a coupled electronic device by way of inductive charging or a wired connection.

As described herein, a power source may drive time-varying current to a transmitter coil. In response, the transmitter coil may generate a time-varying magnetic field. The time-varying magnetic field may induce current in one or more coils of the receiver. The current may then be converted from AC to DC for use in charging a battery of an electronic device.

A. Receiver Structure

Figure 6A:
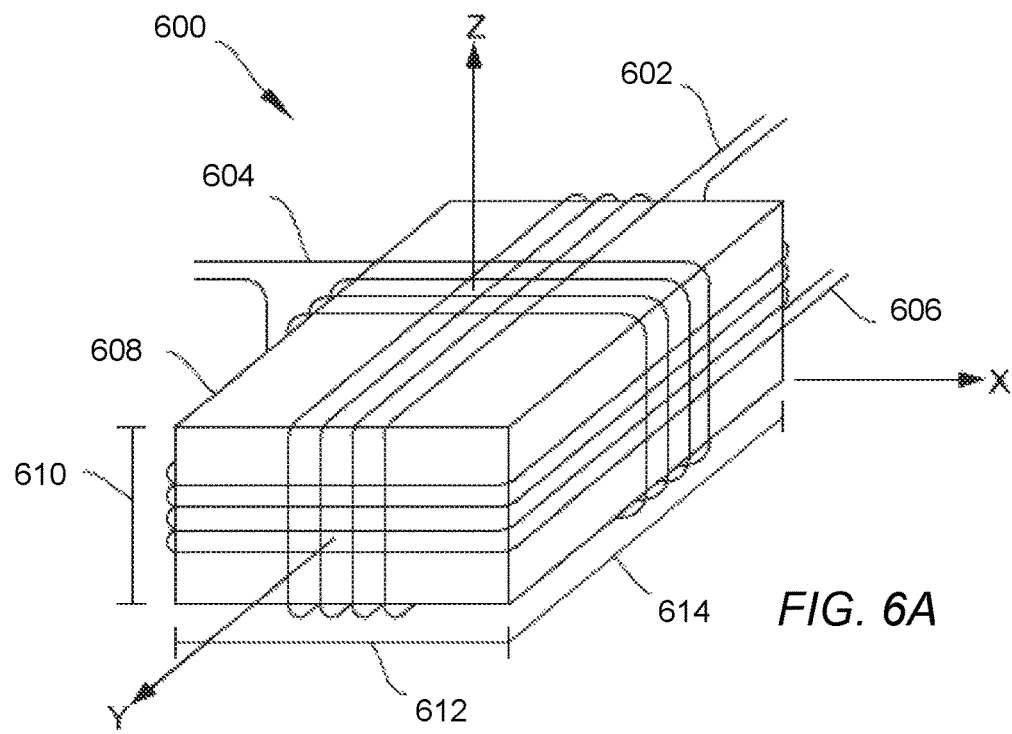
FIG. 6A is a simplified diagram illustrating a receiver including a core and coils wrapped around the core, in accordance with embodiments of the present disclosure.

Unlike conventional receivers that have only one coil for generating power from a magnetic field along one axis, a receiver according to some embodiments described herein may have more than one coil for generating power from a time-varying magnetic field in more than one direction. FIG. 6A illustrates an exemplary receiver 600 according to embodiments of the present disclosure. In some embodiments, receiver 600 may include three coils: a first coil 602, a second coil 604, and a third coil 606. Each coil may be disposed about a core 608 in different directions such that current may be induced in at least one of coils 602, 604, and 606 when exposed to an anisotropic magnetic field. For instance, as shown in FIG. 6A, first coil 602 may be disposed about a first axis of core 608 extending in an X-direction, second coil 604 may be disposed about a second axis of core 608 extending in a Y-direction, and third coil 606 may be disposed about a third axis of core 608 extending in a Z-direction. In some embodiments, each of the first, second, and third axis can be substantially perpendicular to one another. As further shown in FIG. 6A, coils 602, 604, and 606 can be disposed over each other in a particular order. This, however, is not intended to be limiting as coils 602, 604, and 606 can be disposed in any suitable configuration.

In some embodiments, coils 602, 604, and 606 of receiver 600 are wound about core 608. As shown in FIG. 6A, core 608 may be in the form of a rectangular prism in some embodiments. The rectangular prism may have dimensions that range between 1 to 10 mm thick 610, 20 to 100 mm wide 612, and 1 to 50 mm long 614. In some embodiments, the rectangular prism may have dimensions that range between 4-5 mm thick 610, 50-70 mm wide 612, and 10-30 mm long 614. In various embodiments, core 608 can have any other suitable shape and dimensions.

Core 608 may be formed of any suitable material capable of concentrating magnetic fields. For instance, core 608 may comprise a ferromagnetic material such as ferrite in one example. The amount of magnetic material in the core may be tailored to result in a core that has a magnetic permeability ($\mu$) ranging between 50 and 250, e.g., between 100 and 200.

Coils 602, 604, and 606 may be wound around core 608 any suitable number of times such that a sufficient power is generated when subjected to a magnetic field. Power may be generated by the induced current and the resulting voltage established by the number of turns. The number of turns may be a function of a voltage-over-current ratio in a corresponding receiver of an electronic device (e.g., if the receiver 600 is disposed in a dock that wirelessly charges the electronic device), as well as a configuration of impedance matching networks (i.e., Z matching networks). In some embodiments, coils 602, 604, and 606 may be wound around the core between 1 to 10 times, such as 4 to 7 times. Each of coils 602, 604, and 606 may be wound around core 608 the same number of times in some embodiments. In other embodiments, one or more of coils 602, 604, and 606 may be wrapped around core 608 a different number of times than the other coils. Coils 602, 604, and 606 may be insulated from one another as well as from core 608. In some instances, coils 602, 604, and 606 are in the form of insulated wires. In other instances, coils 602, 604, and 606 are formed of patterned wires insulated by layers of insulating material. Details of how receiver 600 is formed according to some embodiments is discussed in more detail further herein.

Figure 6B:
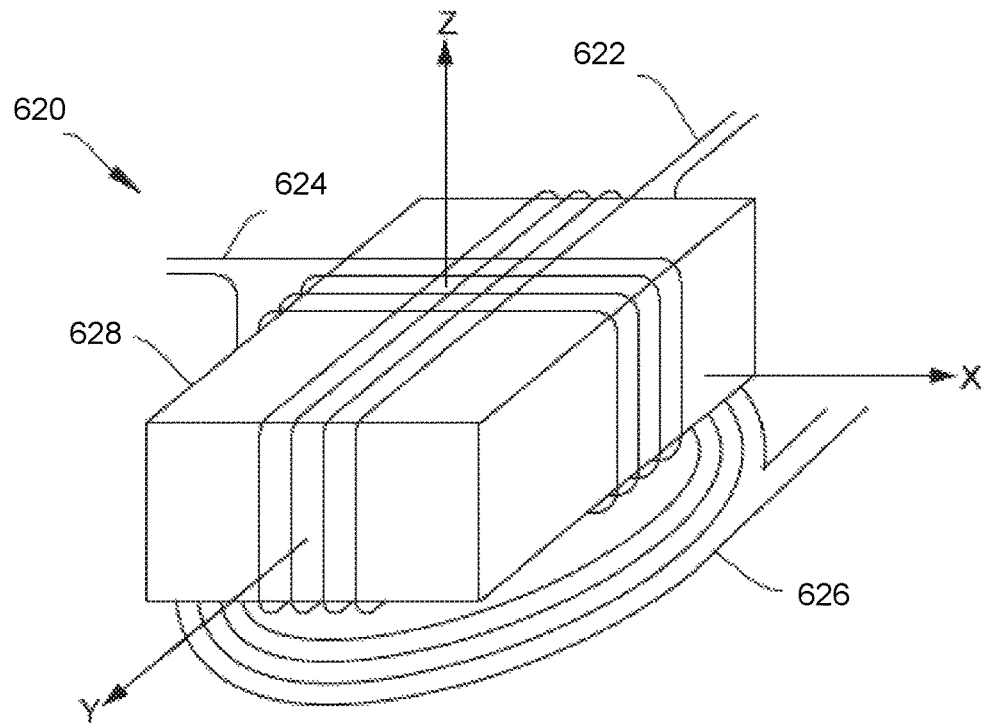
FIG. 6B is a simplified diagram illustrating a receiver including a core and coils wrapped around the core and disposed underneath the core, in accordance with embodiments of the present disclosure.

Although FIG. 6A illustrates a receiver 600 as having all three coils wrapped around a core, embodiments are not limited to such configurations. For instance, one or more coils may not be wrapped around the core. FIG. 6B illustrates an exemplary receiver 620 where one coil is not wrapped around a core 628. As shown, a first coil 622 may be disposed about a first axis of core 628 extending in an X-direction and a second coil 624 may be disposed about a second axis of core 628 extending in a Y-direction. First coil 622 and second coil 624 can be wrapped around core 628. A third coil 626 may be disposed about a third axis of core 628 extending in a Z-direction but with third coil 626 being disposed below core 628. In certain embodiments, a ferromagnetic plate (not shown) may be disposed between core 628 and third coil 626. The magnetic plate may help concentrate magnetic fields in the Z-direction to enhance power generation by third coil 626. Any of coils 622, 624, and 626 can be disposed adjacent to but not wrapped around core 628.

Figure 7A:
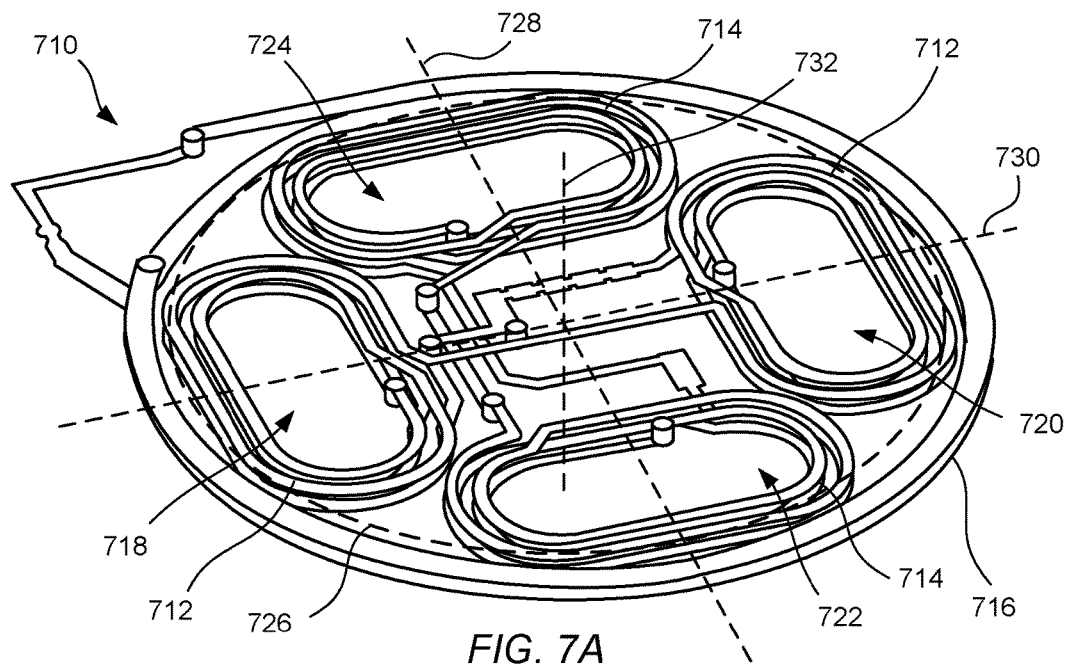
FIG. 7A is a simplified diagram illustrating a receiver including coils having oval-shaped loop portions and a shielding disk disposed above the coils, in accordance with embodiments of the present disclosure.

FIG. 7A is a simplified diagram of an alternative exemplary receiver 710 according to embodiments of the present disclosure. Receiver 710 may include three coils: a first coil 712, a second coil 714, and a third coil 716. First coil 712 may be formed of a winding of wire having a first loop portion 718 and a second loop portion 720, and second coil 714 may be formed of a winding of wire having a first loop portion 722 and a second loop portion 724. In embodiments, first coil 712 and second coil 714 may each overlap itself near a midpoint between respective first and second loop portions 718, 720 and 722, 724. The overlapping wire portions near the midpoint may be insulated from one another to minimize interference and/or prevent occurrence of short circuiting. Accordingly, a single current may flow through both first and second loop portions of each coil. Additionally, each coil 712, 714, and 716 may be electrically isolated from one another such that there is minimal interference between them.

In embodiments, third coil 716 may be positioned around both first and second coils 712 and 714. For instance, third coil 716 may encircle both first and second coils 712 and 714. In certain embodiments, third coil 716 may encircle both first and second loop portions 718 and 720 of first coil 712 and both first and second loop portions 722 and 724 of second coil 714. A diameter of third coil 916 may be greater than the largest distance between ends of first coil 712 or second coil 714.

In embodiments, first coil 712 and second coil 714 may each be centered along an axis. For example, first coil 712 may be centered along first axis 728, and second coil 714 may be centered along second axis 730. First and second axis 728 and 730 may be offset from one another at an angle, such as a 90 degree angle as shown in FIG. 7A. In some embodiments, first and second axis 728 and 730 may intersect at a center of receiver 710 such that loop portions 718, 720, 722, and 724 may be disposed symmetrically around the center of receiver 710. In embodiments, third coil 716 may be disposed about a third axis 732 positioned through the center of receiver 710 and extending in a direction perpendicular to both first and second axis 728 and 730.

Figure 7B:
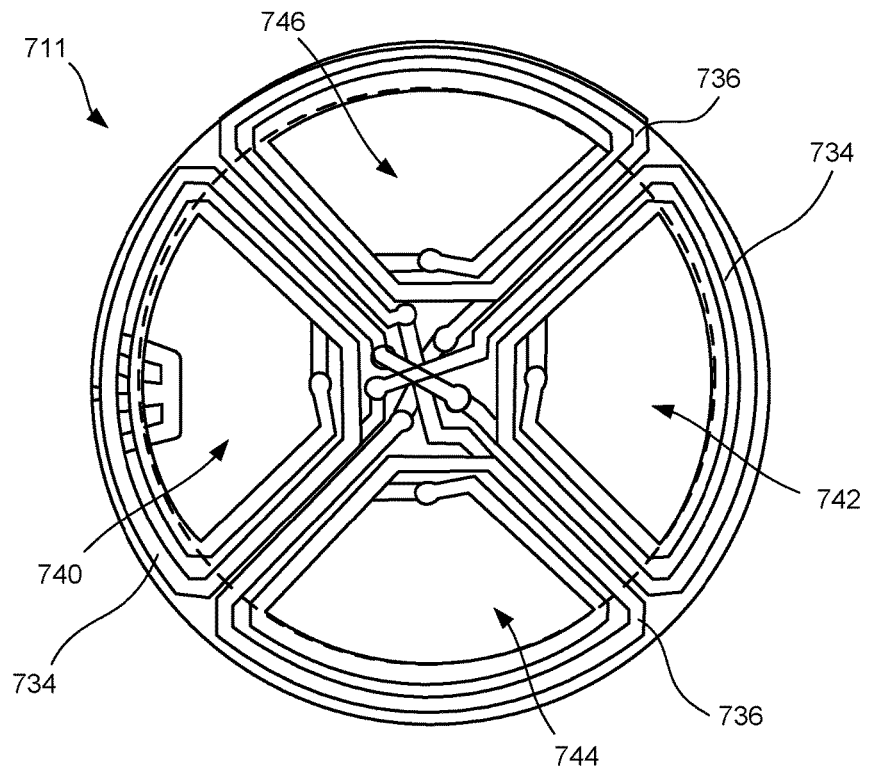
FIG. 7B is a simplified diagram illustrating a receiver including coils having bow tie-shaped loop portions and a shielding disk disposed above the coils, in accordance with embodiments of the present disclosure.

As illustrated in FIG. 7A, first and second coils 712 and 714 may each have first and second loops that are arranged in an oval-shaped profile. However, embodiments are not limited to such profiles. For instance, first and second loops may have profiles that are non-oval, circular, square, rectangular, or any other loop profile. As an example, first and second coils 712 and 714 may have first and second loop profiles arranged in a bow tie profile, as shown in FIG. 7B, which illustrates an exemplary receiver 711. Receiver 711 may have a first coil 734 and a second coil 736. Similar to FIG. 7A, a third coil (not shown) may encompass first and second coils 734 and 736. In some embodiments, the third coil is substantially planar with first and/or second coils 734 and 736. First coil 734 may include a first loop portion 740 and a second loop portion 742, and second coil 736 may include a first loop portion 744 and a second loop portion 746. The first and second loop portions of both coils may have bow tie profiles that taper towards a midpoint between respective first and second loop portions. In such embodiments, the bow tie loop profiles minimize air gaps between first and second coils 734 and 736, thereby increasing the efficiency at which receiver 711 generates current from magnetic fields. It is to be appreciated that any suitable loop profile for interacting with magnetic fields are envisioned herein.

With reference back to FIG. 7A, in embodiments, receiver 710 may also include a shielding disk 726 positioned on top of first and second coils 712 and 714. Shielding disk 726 may have a structure that complements the overall structure of first and second coils 712 and 714. For example, shielding disk 726 may have a circular structure such that its outer edges are adjacent to the outer radial edges of first and second coils 712 and 714, as shown in FIG. 7A. In embodiments, shielding disk 726 may be formed of a ferromagnetic material (e.g., ferrite sheet material) used to concentrate magnetic fields and direct them in accordance with the selected geometry based upon the arrangement of the receiver. Shielding disk 726 may be used to guide magnetic fields through first and second coils 712 and 714; additionally, shielding disk 726 may have a thin structure to minimize the size of receiver 710, as will be discussed further herein with respect to FIG. 7C.

FIG. 7C is a simplified diagram illustrating a cross-sectional view of receiver 710 according to an embodiment of the present disclosure. As shown, first and second coils 712 and 714 may be embedded in a substrate 730 disposed below shielding disk 726. Substrate 730 may be any suitable substrate capable of housing and electrically isolating embedded coils of wire. As an example, substrate 730 may be a printed circuit board (PCB). First and second coils 712 and 714 are illustrated as a series of circles due to the cross-sectional perspective of the illustration of FIG. 7C. Accordingly, first loop portion 722 of coil 712 may be represented by circles 712a and 712b, and second loop portion 724 of coil 712 may be represented by circles 712c and 712d. Second coil 714 may be represented by circles 714a and 714b, and third coil 716 may be represented by circles 716a and 716b. First, second, and third coils may be arranged such that a current may be generated in respective coils upon interaction with magnetic fields.

In embodiments, at least two of coils 712, 714, and 716 may be positioned in the same plane. As an example, coils 712 and 716 may be positioned in the same plane. In other examples, all three coils 712, 714, and 716 may be positioned in the same plane. Positioning coils 712, 714, and 716 in the same plane enables the structure of receiver 710 to be substantially low profile, meaning the Z-height of receiver 710 may be substantially small. For instance, the overall Z-height of receiver 710 may be less than a millimeter thick. In an embodiment, the overall Z-height of receiver 710 may be approximately 0.5 mm. In such embodiments, the thickness of shielding disk 726 may be less than the overall Z-height of receiver 710. It is to be appreciated that although the thickness of shielding disk 726 is less than the overall Z-height of receiver 710, it is not too thin such that it is not capable of concentrating and redirecting magnetic fields. An example of such redirection of magnetic fields is illustrated in FIG. 7D. When a magnetic field 748 propagates at an angle with respect to the plane of first or second coil 712 or 714, respectively, shielding disk 726 may redirect magnetic field 748 through its structure. Accordingly, magnetic field 748 may propagate through loops of first and second coils 712 and 714 to induce a current in first and second coils 712 and 714. In embodiments, the thickness of shielding disk 726 may range between 0.2 to 0.5 mm. In a particular embodiment, the thickness of shielding disk 726 is 0.3 mm.

B. Receiver Operation

Figure 8:
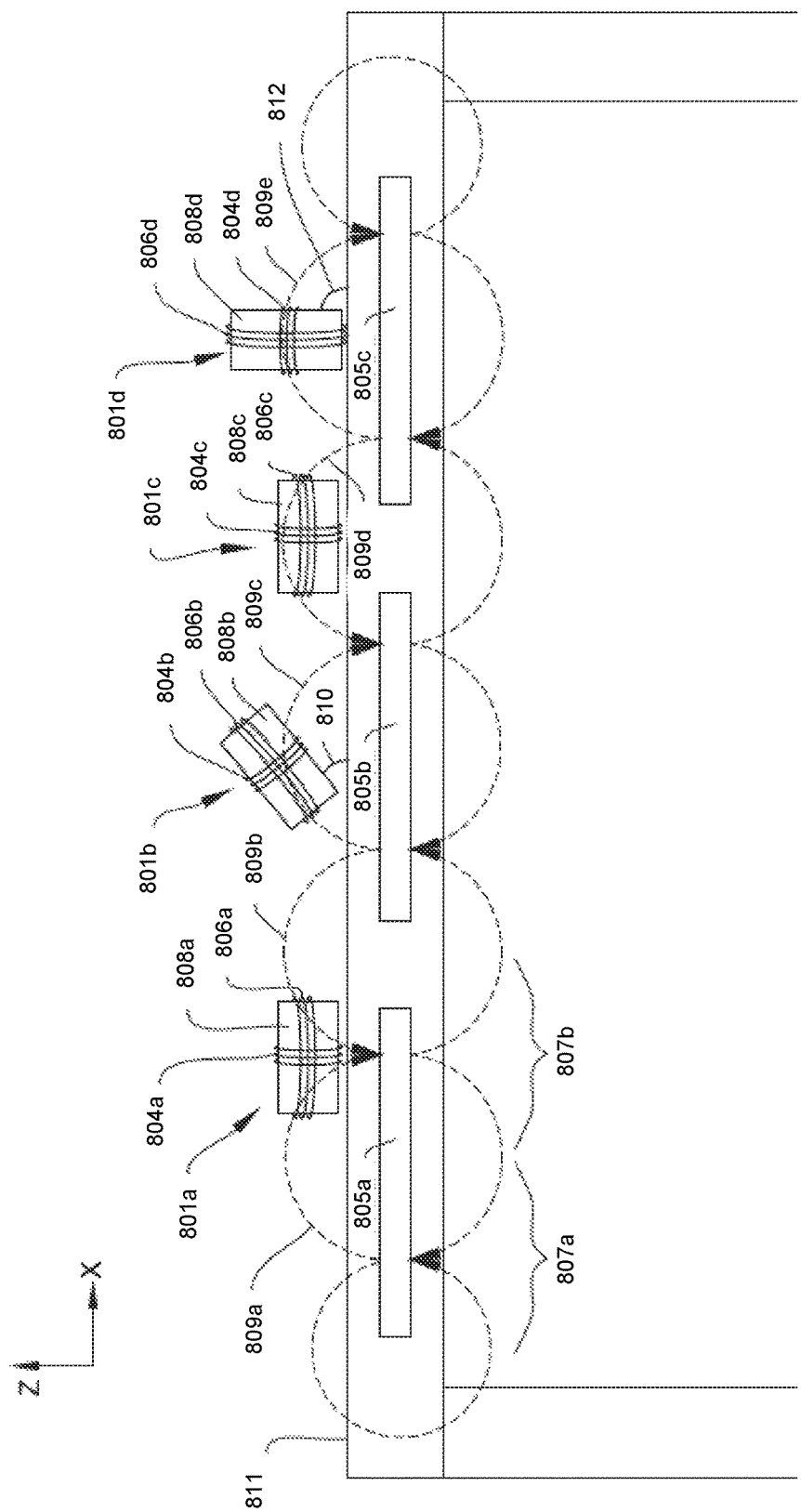
FIG. 8 is a simplified diagram illustrating a receiver interacting with a transmitter in a wireless charging station in the X and Z directions, in accordance with embodiments of the present disclosure.
Figure 9:
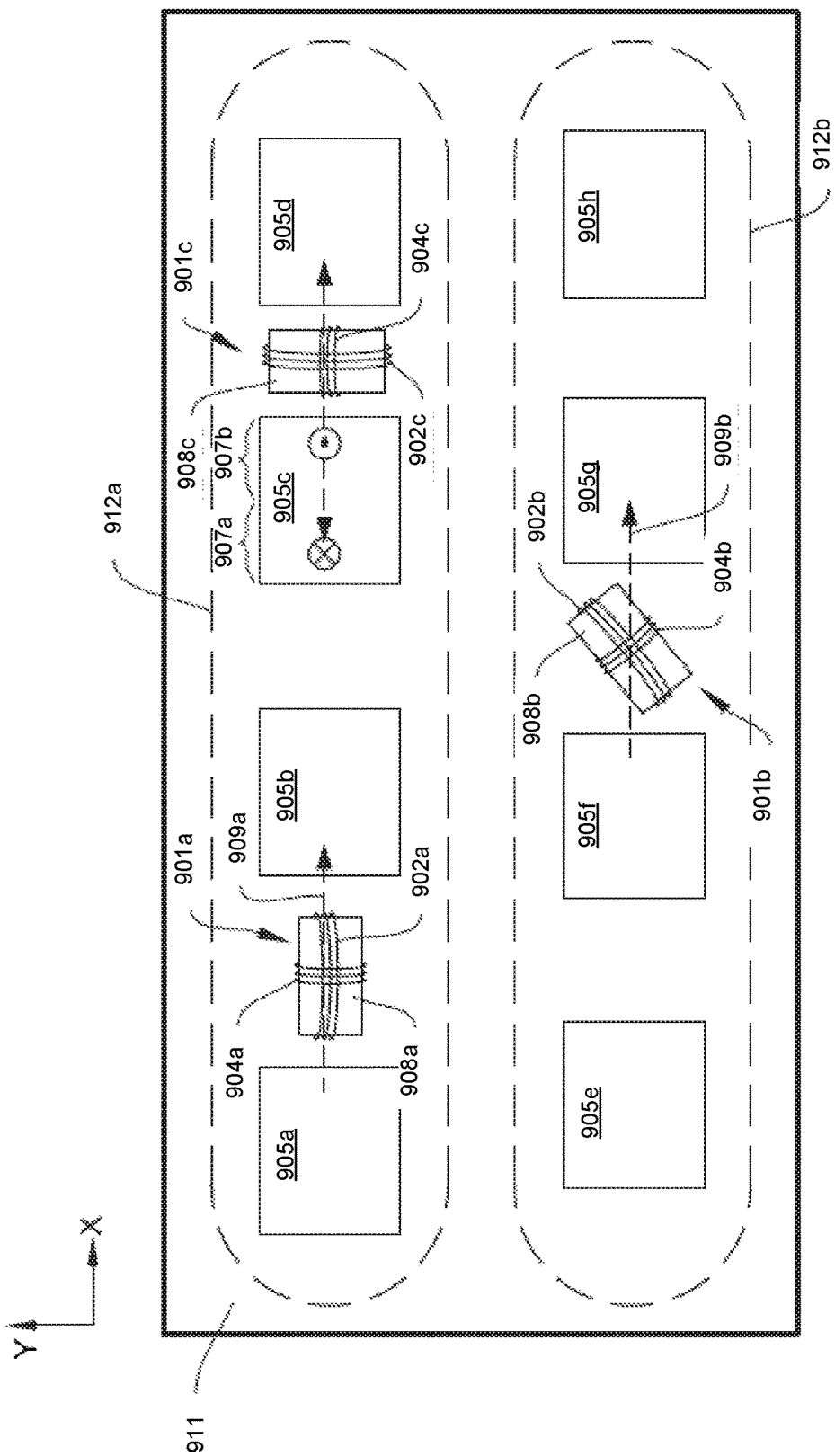
FIG. 9 is a simplified diagram illustrating a receiver interacting with a transmitter in a wireless charging station in the X and Y directions, in accordance with embodiments of the present disclosure.

According to some embodiments herein, the arrangement of three coils disposed about a core in three different directions enables power to be generated by a receiver in a magnetic field when the receiver is placed in any orientation. FIGS. 8 and 9 illustrate the operation of a receiver when placed against a charging surface according to embodiments of the present disclosure. Specifically, FIG. 8 illustrates receiver operation in the X and Z directions, and FIG. 9 illustrates receiver operation in the X and Y directions. The receiver in FIGS. 8 and 9 are illustrated as receiver 600 in FIG. 6A; however, it is to be appreciated that any other type of receiver may be used instead. For instance, receiver 710 or receiver 711 in FIGS. 7A and 7B, respectively, may be used in place of the receiver in FIGS. 8 and 9.

As shown in FIG. 8, receivers 801a-801d disposed in a dock or an electronic device (neither of which are not shown for ease of explanation) may be placed on a charging surface 811 of a charging structure 813. Receiver coils 804 and 806 may be disposed about core 808 in the X and Z directions, respectively. Transmitter coils 805a-805c, each having loop portions 807a and 807b, may generate time-varying magnetic fields, such as magnetic fields 809a-809e, that extend above charging surface 811. Charging structure 813 is illustrated as a table having a substantially planar top surface, but any other charging structure 813 may be used. Additionally, transmitter coils 805a-805c are illustrated as embedded within the table, but may be disposed underneath charging structure 813 in other embodiments. Each of receivers 801a-801d is placed in a different location and/or orientation on charging surface 811 to illustrate how the receivers can receive power from magnetic fields 809a-809e.

Receiver 801a is positioned above a loop portion, e.g., 807b, of a transmitter coil, e.g., 805a. Magnetic fields generated by loop portion 807b may include a substantially vertical component, i.e., along the Z-direction. Accordingly, a current may be induced from these fields in receiver coil 806a and may be used to generate power. Because the magnetic field may not be substantially disposed along the X-direction at this location, a current may not be generated in receiver coil 804a, thus causing receiver coil 804a to generate little to no power.

Receiver 801c is positioned between transmitter coils 805b and 805c. Unlike conventional systems, receiver 804c can receive power from magnetic fields disposed between transmitter coils 805b and 805c. As shown, bridging magnetic field 809d may be disposed between transmitter coils 805b and 805c and may include a substantially horizontal component. Accordingly, a current may be induced in receiver coil 804c and may be used to generate power. Because the magnetic field 809d may not be substantially disposed along the Z-direction at this location, a current may not be generated in receiver coil 806c, thus causing receiver coil 806c to generate little to no power.

In addition to being placed flush against charging surface 811 to generate power, receiver 801 can be tilted or even placed on its side and still generate power. For instance, receiver 801b is tilted at an angle 810 that is less than 60 degrees (e.g., 45 degrees) to the charging surface 811. When tilted, currents may be induced by magnetic field 809c in both receiver coils 804b and 806b. In some embodiments, portions of magnetic field 809d proportionally induce corresponding currents in both receiver coils 804b and 806b. As angle 810 increases to a point where it is completely perpendicular to charging surface 811 (e.g., the position of receiver 801d), current may cease to be induced in receiver coil 804d, but may be more strongly induced in receiver coil 806d. Thus, magnetic field 809e may induce a current in receiver coil 806d, such that receiver coil 806d can be used to generate power from magnetic field 809e. Even though receiver coil 806d is disposed about the Z-direction relative to core 808d, receiver coil 806d is positioned about the X-direction relative to charging surface 811. Accordingly, receiver coil 806d may generate power from magnetic field 809e.

With reference now to FIG. 9, FIG. 9 illustrates receivers 901a-901c resting on a charging surface 911 in the X and Y direction. Receivers 901a-901c may rest on charging surface 911 in different locations and in different orientations. Receiver coils 904a-904c and 902a-902c may each be disposed about their respective cores 908a-908c in the X and Y directions, respectively. Transmitter coils 905a-905h, each having loop portions 907a and 907b, may generate time-varying magnetic fields (including magnetic fields 909a-909c) that extend above charging surface 911. All magnetic fields may operate in concert to form charging regions 912a and 912b which can overlap in some embodiments. In some embodiments, transmitter coils 905a-905h may be arranged in an N×M array that is capable of generating a substantially rectangular charging region. In other embodiments it may be possible to form circular, oval or other shaped charging regions by arranging coils 905a-905h in different patterns. Each of receivers 901a-901c is placed in a different location and/or orientation to illustrate how the receiver can generate power from magnetic fields in charging regions 912a and 912b.

Receiver 901a is positioned between transmitter coils 905a and 905b. Unlike conventional systems, receiver 901a can receive power from magnetic fields disposed between transmitter coils 905a and 905b. As shown, bridging magnetic field 909a may be disposed between transmitter coils 905a and 905b and may include a substantially horizontal component. Accordingly, a current may be induced in receiver coil 904a and may be used to generate power. Because magnetic field 909a may not be substantially disposed along the Y-direction at this location, a current may not be generated in receiver coil 902a, thus causing receiver coil 902a to generate little to no power.

In some embodiments, receivers can also be rotated at an angle less than or equal to 60 degrees and still generate power. Receiver 901b is rotated at an angle that is less than 60 degrees (e.g., 45 degrees) to the X-direction. When rotated, currents may be induced by magnetic field 909b in both receiver coils 902b and 904b. In some embodiments, a portion of magnetic field 909b induces corresponding currents in both receiver coils 902b and 904b. As the angle increases to a point where it is completely perpendicular to the X-direction (e.g., the position of receiver 901c), current may cease to be induced in receiver coil 904c, but may be more strongly induced in receiver coil 902c. Thus, magnetic field 909c may induce a current in receiver coil 902c, such that receiver coil 902c can be used to generate power from magnetic field 909c. Even though receiver coil 902c is disposed about the Y-direction relative to core 908c, receiver coil 902c is positioned about the X-direction relative to charging surface 911. Accordingly, receiver coil 902c may generate power from magnetic field 909c.

Although embodiments illustrate receivers 901a-901c located between transmitter coils 905a-905h, any of receivers 901a-901c may be placed in regions above transmitter coils 905a-905h to generate power as well. For instance, receiver 901c may be placed on transmitter 905c such that receiver 901c may generate power from magnetic field 909d.

Accordingly, as shown in FIGS. 8 and 9, receivers discussed herein may generate power in any orientation on a charging surface, according to embodiments of the present disclosure. This allows a docking station or electronic device, embedded with such a receiver, to not have to be placed above a transmitter coil in any particular orientation in some embodiments.

It should also be noted that in some embodiments, only certain transmitter coils 905a-905h that are close enough to a receiver, e.g., any of receivers 901a-901c, can be selectively energized to generate a magnetic field that induces a current in at least one of the coils of the receiver. A location of the receiver with respect to transmitter coils 905a-905h can be determined in any number of ways. In some embodiments, charging surface 911 can include a sensor configured to identify a location and orientation of an electronic device within which the receiver is housed. For example, a capacitive sensor can be configured to detect contact between a housing of the electronic device and the capacitive sensor. In some embodiments, a power expenditure can be measured when all of transmitter coils 905a-905h are energized and then only those transmitter coils 905a-905h with the largest variations caused by interaction with a receiving coil of an electronic device can remain energized.

Figure 10:
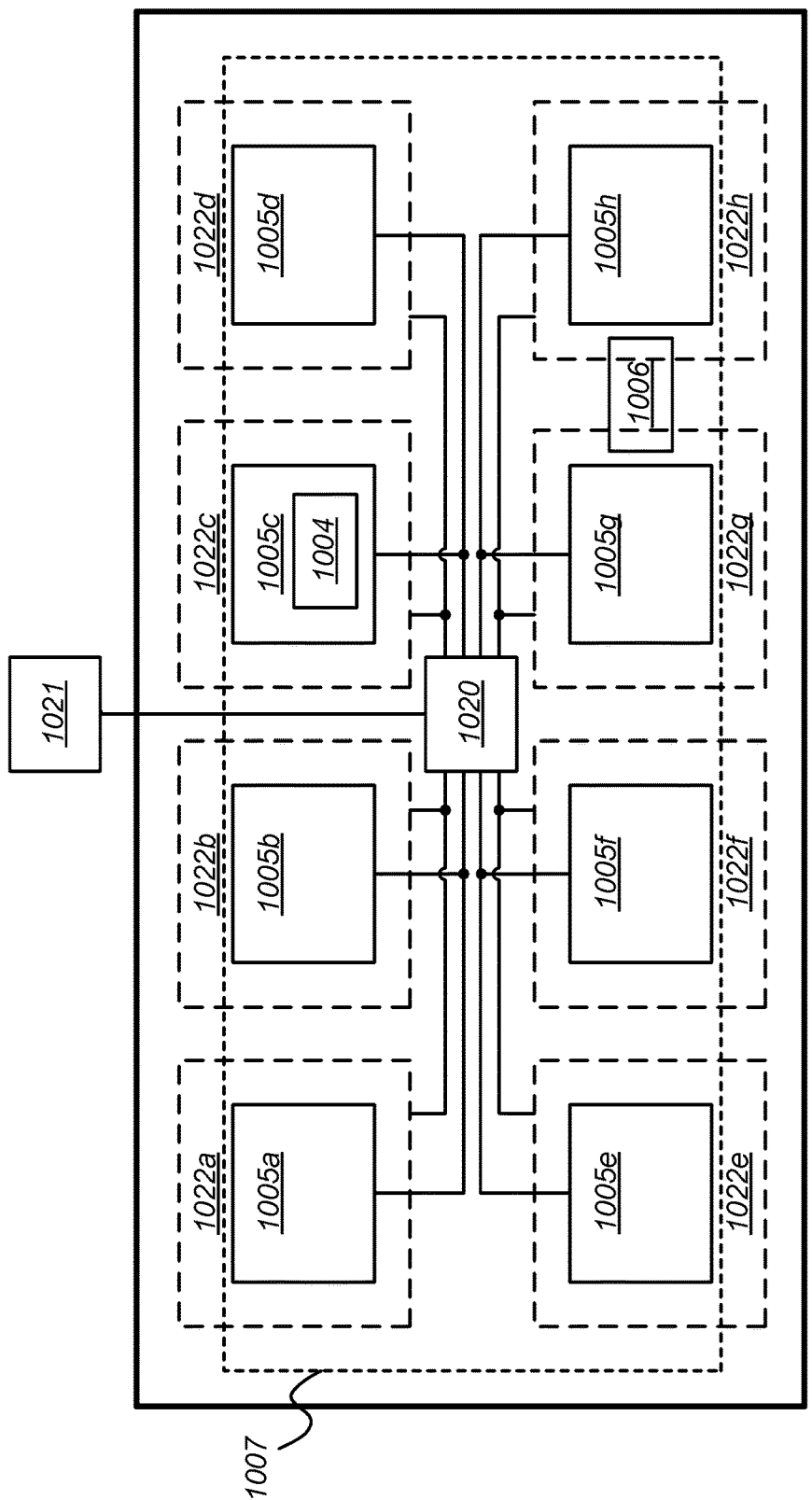
FIG. 10 is a simplified diagram illustrating a charging surface configured to selectively energize certain transmitters closest to an electronic device, in accordance with embodiments of the present disclosure.

One such example is shown in FIG. 10. Specifically, FIG. 10 illustrates an exemplary charging surface 1000 configured to enable selective energizing of transmitter coils 1005a-1005h. Charging surface 1000 can be part of a wireless charging table, such as charging structure 500 shown in FIG. 5 or table 800 shown in FIGS. 8 and 9 or can be part of a wireless charging mat or other wireless charging structure. As shown in FIG. 10, charging surface 1000 may include transmitter coils 1005a-1005h and a plurality of sensors 1022a-1022h. Charging surface 1000 may also include a power distribution system 1007 configured to receive power from an alternating current (AC) power source 1021 (e.g., from a wall outlet) and distribute the AC power to one or more transmitter coils 1005a-1005h. In embodiments, the power distribution system includes a controller 1020 coupled to transmitter coils 1005a-1005h and sensors 1022a-1022h. Controller 1020 may be configured to receive information from sensors 1022a-1022h and/or transmitter coils 1005a-1005h and control the operation of transmitter coils 1005a-1005h in response to the received information. Sensors 1022a-1022h can be any type of sensor that enables the charging surface to detect the presence and location of one or more electronic devices, such as electronic devices 1004 and 1006 on the charging surface. As one example, sensors 1022a-1022h can be capacitive sensors.

As shown in FIG. 10, individual electronic devices to be charged can be placed at various locations on charging surface 1000. Sometimes a device may be placed directly over or very near an individual coil—illustrated in FIG. 10 as device 1004 placed directly over coil 1005c. At other times a device may be placed in between two or more coils—illustrated in FIG. 10 as device 1006 placed between coils 1005g and 1005h. In the first situation, the presence of electronic device 1004 can be detected by sensor 1022c and cause sensor 1022c to send information to controller 1020. Controller 1020 can then use this information and determine that transmitter 1005c should be turned on to provide power to device 1004, as transmitter 1005c is closest to electronic device 1004. In the second situation, the presence of electronic device 1006 can be detected by both sensors 1022g and 1022h, each of which can send information to controller 1020, which may then use the information to determine that transmitter 1005g and 1005h should be turned on to provide power to device 1006.

Once presence of the electronic device is detected, one or more verification procedures may be performed to ensure that the electronic device is a device that is suitable for receiving power from the transmitter coils. For instance, after detecting the presence of the electronic device, a communication channel may be established between controller 1020 and one or more electronic device, e.g., electronic devices 1004 and 1006. The electronic device may then be queried for its identification to verify that the device is suitable for receiving power from the transmitter coils. After receiving and verifying the identification of the electronic device, magnetic fields may be generated by transmitter coils close enough to the electronic device. If no communication channel can be established with the electronic device, then it may be determined that the electronic device is in fact not an electronic device, or not an electronic device that is suitable for receiving power from the transmitter coils. In which case, no transmitter coils may be activated to generate magnetic fields to the electronic device. Performing verification procedures ensures that magnetic fields are not generated for objects that are not electronic devices that can receive the generated magnetic fields, and ensures that if the object is an electronic device, it is an electronic device that is configured to receive the generated magnetic fields. In this way, no additional energy need to be expended energizing transmitter coils that are not being utilized.

IV. Stacked Transmitter and Receiver Coils

Figure 11:
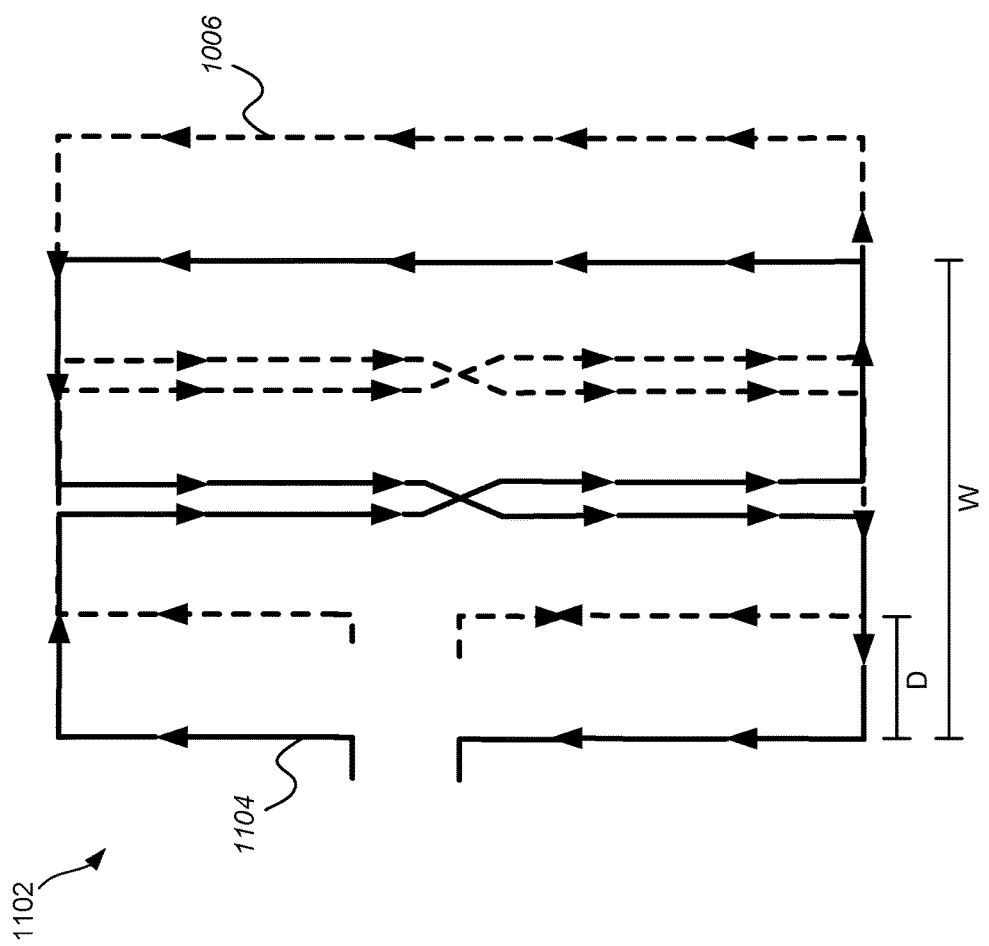
FIG. 11 is a simplified diagram of a stacked transmitter, in accordance with embodiments of the present disclosure.

In certain embodiments, transmitter coils may be stacked upon one another to provide a continuous charging region with minimal dead zones. FIG. 11 is a simplified diagram illustrating a top-down view of a stacked transmitter 1102 according to embodiments of the present disclosure. The structure, current flow, and generation of magnetic fields may be similar to transmitter coil 200 discussed herein with respect to FIG. 2A. Stacked transmitter 1102 may include a first transmitter coil 1104 and a second transmitter coil 1106 positioned over at least a portion of first transmitter coil 1104. First and second transmitter coils 1104 may each be a transmitter coil having any suitable transmitter profile discussed herein, such as a bow tie profile, bent L-shaped profile, or a rectangular profile as shown in FIG. 11.

First and second transmitter coils 1104 and 1106 may be horizontally offset from one another by a distance D, which may be selected to be a distance that enables stacked transmitter 1102 to generate overlapping magnetic fields to form a charging region, e.g., charging regions 912a and 912b in FIG. 9, with minimal dead zones. In an embodiment, distance D is a fraction of an entire width of a transmitter coil. For instance, distance D is a quarter of a width W of first transmitter coil 1104. Although FIG. 11 shows first and second transmitter coils 1104 and 1106 offset from one another in a horizontal direction, embodiments are not so limited. First and second transmitter coils 1104 and 1106 may be offset from one another in a horizontal direction, vertical direction, or both horizontal and vertical directions, as long as at least a portion of second transmitter coil 1106 overlaps a portion of first transmitter coil 1104.

Figure 12:
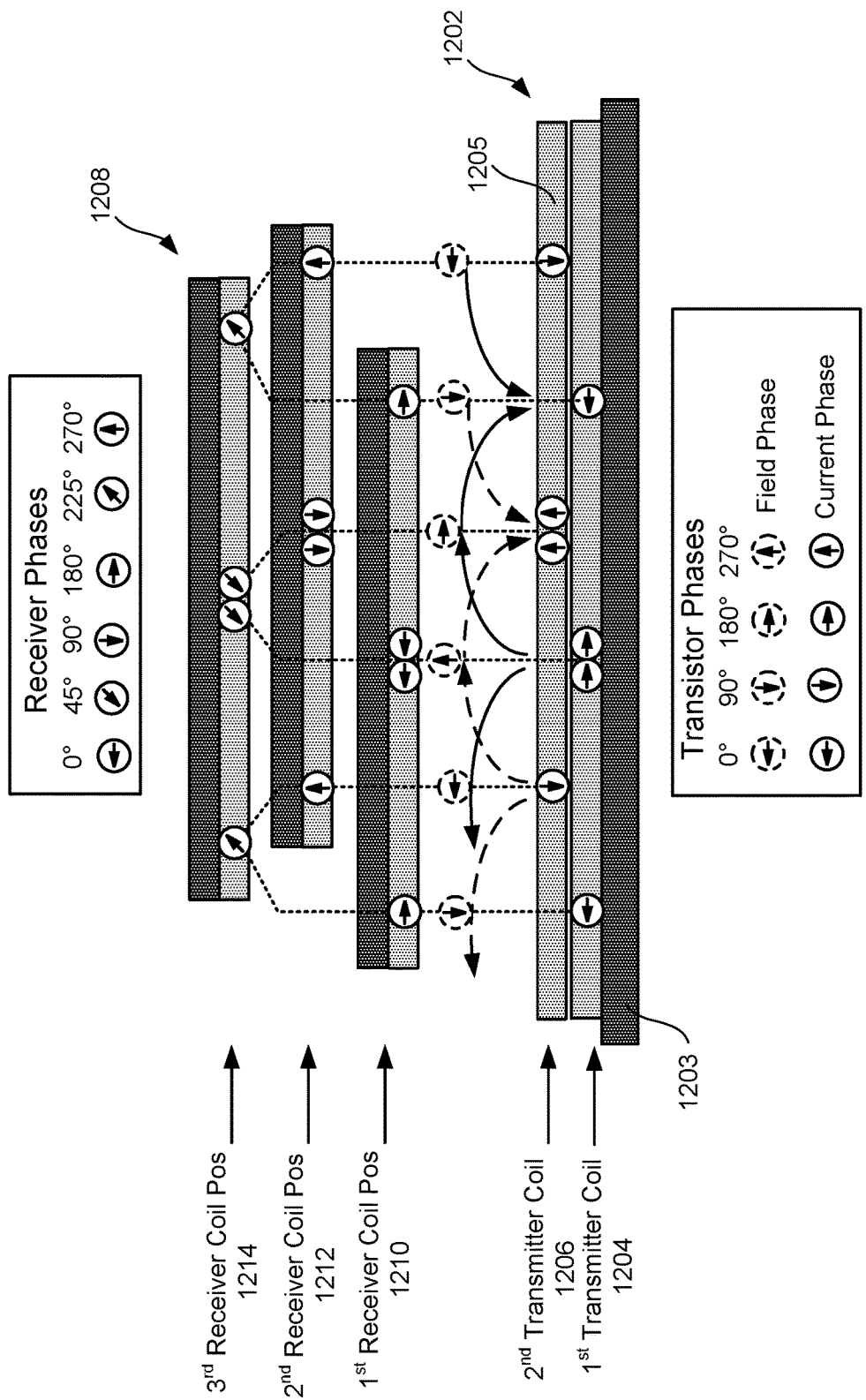
FIG. 12 is a simplified diagram illustrating a cross-sectional view of an exemplary stacked transmitter and the interaction of its generated magnetic fields with a receiver placed in various positions, in accordance with embodiments of the present disclosure.

FIG. 12 is a simplified diagram illustrating a cross-sectional view of an exemplary stacked transmitter 1202 and the interaction of its generated magnetic fields with a receiver 1208 placed in various positions. As shown, receiver 1208 is placed in three positions: first receiver position 1210, second receiver position 1212, and third receiver position 1214. It is to be appreciated that although FIG. 12 illustrates the three receiver positions stacked upon one another, it is not intended to disclose that receiver 1208 includes three individual receiver stacked upon one another. Rather, it is intended to disclose that receiver 1208 is a single receiver that can be placed in three receiver positions that are offset from one another in the horizontal direction, i.e., translationally offset from one another, within the same horizontal plane.

In embodiments, stacked transmitter 1202 may include a ferrite shield 1203 and two transmitter coils: a first transmitter coil 1204 and a second transmitter coil 1206. Second transmitter coil 1206 may overlap at least a portion of first transmitter coil 1204. Each coil may be embedded within a flexible substrate 1205, such as a printed circuit board. In embodiments, first transmitter coil 1204 may be operated at a frequency that is orthogonal to the frequency at which second transmitter coil 1206 operates such that magnetic fields generated by first transmitter coil 1204 propagate in an opposite direction to magnetic fields generated by second transmitter coil 1206. In the example shown in FIG. 12, first transmitter coil 1204 may operate in the 0° and 180° phases while second transmitter coil 1206 may operate in the 90° and 270° phases. In some embodiments, stacked transmitter 1202 may be carrying significant current during operation. Thus, dimensions of ferrite shield 1203 may affect ferrite losses incurred by stacked transmitter 1202. In particular embodiments, increasing a thickness of ferrite shield 1203 and/or increasing separation between ferrite shield 1203 and first transmitter 1204 may minimize ferrite losses. In certain embodiments, the thickness of ferrite shield 1203 may range between 3-5 mm, and the separation may range between 15 to 25 mm. In an embodiment, the thickness of ferrite shield 1203 is approximately 4 mm, and the separation is approximately 20 mm.

When receiver 1208 is placed in any one of receiver positions 1210, 1212, and 1214, a corresponding current may be generated in one or more coils of the receiver when interacting with the magnetic fields generated by stacked transmitter 1202. The phase of the generated current in receiver 1208 may depend on the position of receiver 1208 relative to stacked coils 1204 and 1206 in stacked transmitter 1202. As an example, when receiver 1208 is placed in first receiver position 1210, receiver 1208 may be vertically aligned with first transmitter coil 1204 such that the phases of the generated current in receiver 1208 are 0° and 180°. When receiver 1208 is placed in second receiver position 1212, receiver 1208 may be vertically aligned with second transmitter coil 1206 such that the phases of the generated current in receiver 1208 are 90° and 270°. Additionally, when receiver 1208 is placed in third receiver position 1214, receiver 1208 may be vertically positioned between first and second transmitter coils 1204 and 1206 such that the phases of the generated current in receiver 1208 are 45° and 225°.

Figure 13:
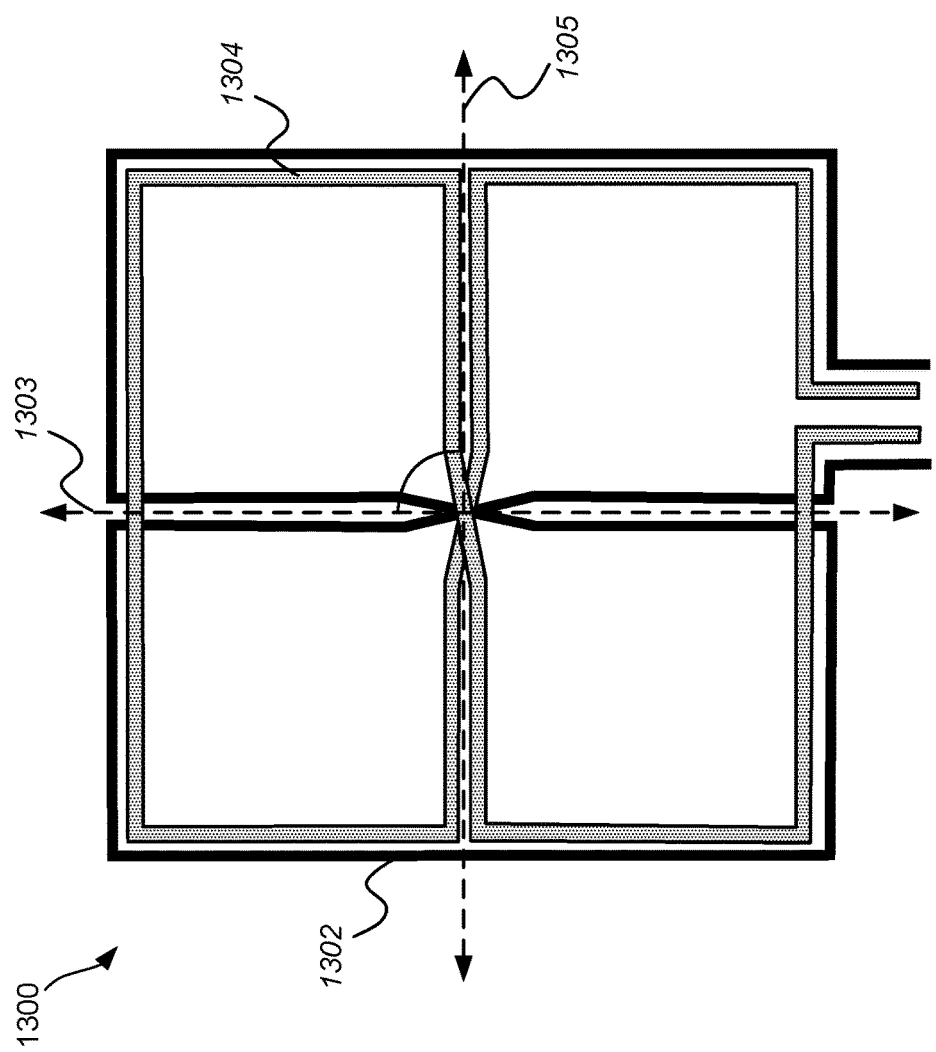
FIG. 13 is a simplified diagram of a stacked receiver, in accordance with embodiments of the present disclosure.

In addition to stacking transistor coils as discussed herein with respect to FIG. 11, a receiver may also include stacked receiver coils, as shown in FIG. 13. FIG. 13 is a simplified diagram of a stacked receiver 1300 having a first receiver coil 1302 and a second receiver coil 1304 overlapping first receiver coil 1302. Similar to receiver 710, each receiver coil 1302 and 1304 may include first and second loop portions for receiving magnetic fields. In embodiments, first and second receiver coils 1302 and 1304 may be centered with one another and oriented at an offset angle. The degree of offset angle may be selected to maximize current generation when stacked receiver 1300 is positioned in magnetic fields generated by a transmitter, such as stacked transmitter 1102 in FIG. 11. As an example, the degree of offset angle may be 90° such that a center line 1303 of first coil 1302 is perpendicular to a center line 1305 of second coil 1304. It is to be noted that any other degree of offset angle is envisioned herein to maximize generation of current in transmitter coils 1302 and 1024 when positioned in a magnetic field.

Figure 14:
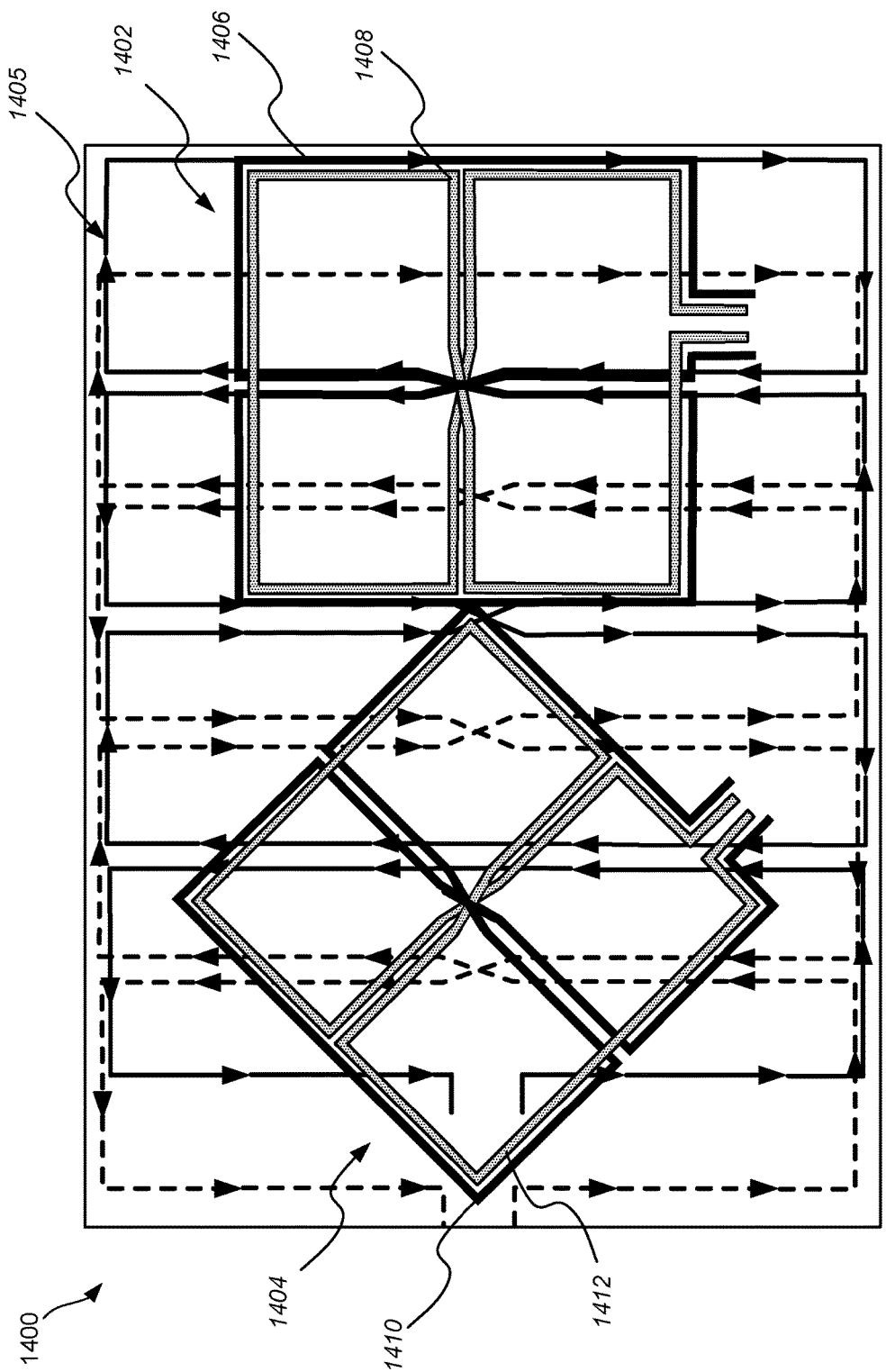
FIG. 14 is a simplified diagram of a charging system including stacked receivers positioned over a plurality of stacked transmitters, in accordance with embodiments of the present disclosure.

FIG. 14 is a simplified diagram illustrating a charging system 1400 including stacked receivers 1402 and 1404 positioned over a plurality of stacked transmitter coils 1405. Stacked receivers 1402 and 1404 may each include two overlapping receiver coils that are positioned at a 90° offset angle from one another. For instance, stacked receiver 1402 may include a first receiver coil 1406 and a second receiver coil 1408, and stacked receiver 1404 may include a first receiver coil 1410 and a second receiver coil 1412. Stacked receivers having this coil arrangement are capable of receiving power from stacked transmitter coils 1405 in different rotational orientations. Depending on the angle of rotation, one or both receiver coils of the stacked receiver may be receiving power. For instance, if a stacked receiver is positioned at an angle that is a multiple of 90° with respect to stacked transmitter coils 1405, one of its receiver coils will receiver power. If the stacked receiver is positioned in any other angle that is not a multiple of 90°, then both of its receiver coils may receiver power.

As shown in FIG. 14, stacked receiver 1402 is positioned parallel to stacked transmitter coils 1405, which is an angle that is a multiple of 90°. Thus, one receiver coil, e.g., receiver coil 1406 of stacked receiver 1402, will receive power from stacked transmitter coils 1405. Stacked receiver 1404, is positioned at an angle that is not a multiple of 90° with respect to stacked transmitter coils 1405. As shown in FIG. 14, stacked receiver 1404 is positioned at an angle of 45° with respect to stacked transmitter coils 1405. Thus, both first and second receiver coils 1410 and 1412 may receiver power from stacked transmitter coils 1405.

V. Method of Forming Receiver

Figure 15:
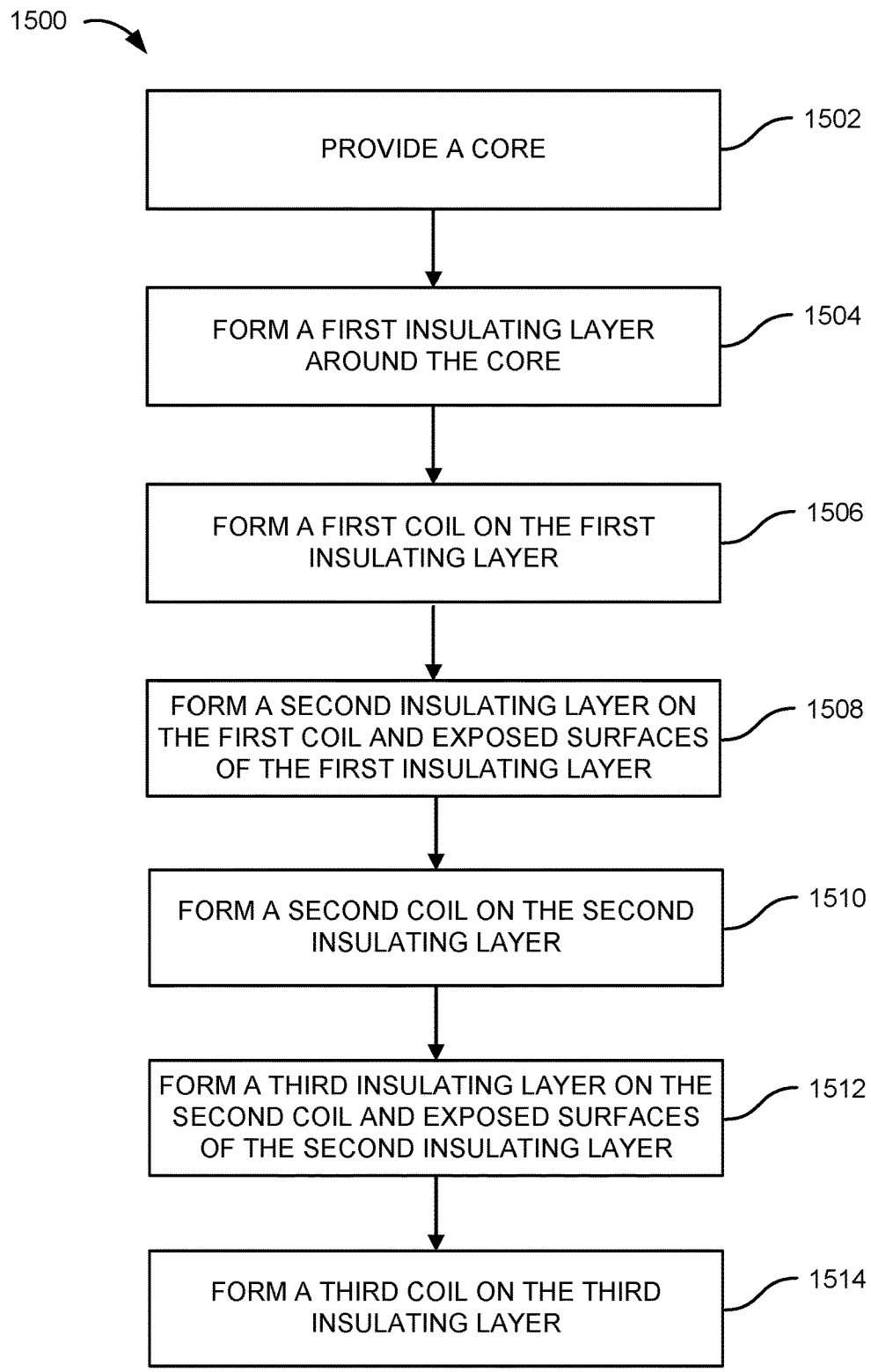
FIG. 15 is a flow diagram illustrating a method of forming a receiver, in accordance with embodiments of the present disclosure.

FIG. 15 illustrates a flow chart for fabricating a wireless charging receiver according to some embodiments of the present disclosure. At block 1502, a core, such as core 608 in FIG. 6A, may be provided. In some embodiments, the core may be a ferromagnetic core that can concentrate magnetic fields. The core may be in the shape of a rectangular prism, or any other shape suitable for maximizing concentration of magnetic fields and compatible with desired coil geometries.

At block 1504, a first insulating layer may be formed around the core. In some embodiments, the insulating layer may be a dielectric film having a dielectric constant suitable to electrically isolate conductive materials from one another. The insulating layer may be formed by a lamination process that presses a layer of insulating film around the core and subsequently cures the insulating film. In other embodiments, the insulating layer may be formed by fusing a first set of two halves together. The two halves may each be a shell formed of an insulating material shaped to cover half of an underlying structure, such as the core. When the two halves are fused together, an insulating layer may be formed around the entire core.

At block 1506, a first coil may be formed on the first insulating layer. The first coil may be any of the three coils 602, 604, and 606 described herein with respect to FIG. 6A. In some embodiments, the first coil may be formed by any suitable patterning process. For instance, the first coil may be formed by a Laser Direct Structuring (LDS) process. In other embodiments, the first coil may be formed by depositing and etching a patterned seed layer and subsequently performing an electroplating process to build up the structure of the first coil. One skilled in the art will understand that any process capable of patterning a coil on an insulating layer may be utilized in embodiments herein.

At block 1508, a second insulating layer may then be formed on the first coil and exposed surfaces of the first insulating layer. As described herein, the second insulating layer may be laminated or may be formed by fusing a second set of two halves of insulating shells. Thereafter, at block 1510, a second coil may be formed on the second insulating layer. The second coil may be any of the three coils 602, 604, and 606 described herein with respect to FIG. 6A. The second coil may be formed by any suitable deposition or patterning process such as those described herein with respect to forming the first coil.

Once the second coil is formed, at block 1512, a third insulating layer may be formed on the second coil and exposed surfaces of the second insulating layer. Similar to first and second insulating layers, the third insulating layer may be laminated or formed by fusing a third set of two halves of insulating shells. Then, at block 1514, a third coil may be formed on the third insulating layer. The third coil may be any of the three coils 602, 604, and 606 discussed herein with respect to FIG. 6A, and may be formed by any suitable deposition or patterning process described herein with respect to forming the first and second coils.

Optionally, a fourth insulating layer may be formed over the third coil and exposed surfaces of the third insulating layer to electrically insulate the third coil and/or protect the third coil from damage during subsequent fabrication steps. The fourth insulating layer may prevent inadvertent shorting between the third coil and other conductive structures. That way, the receiver may be properly protected and insulated from the external environment.

VI. Method of Charging a Device

Figure 16:
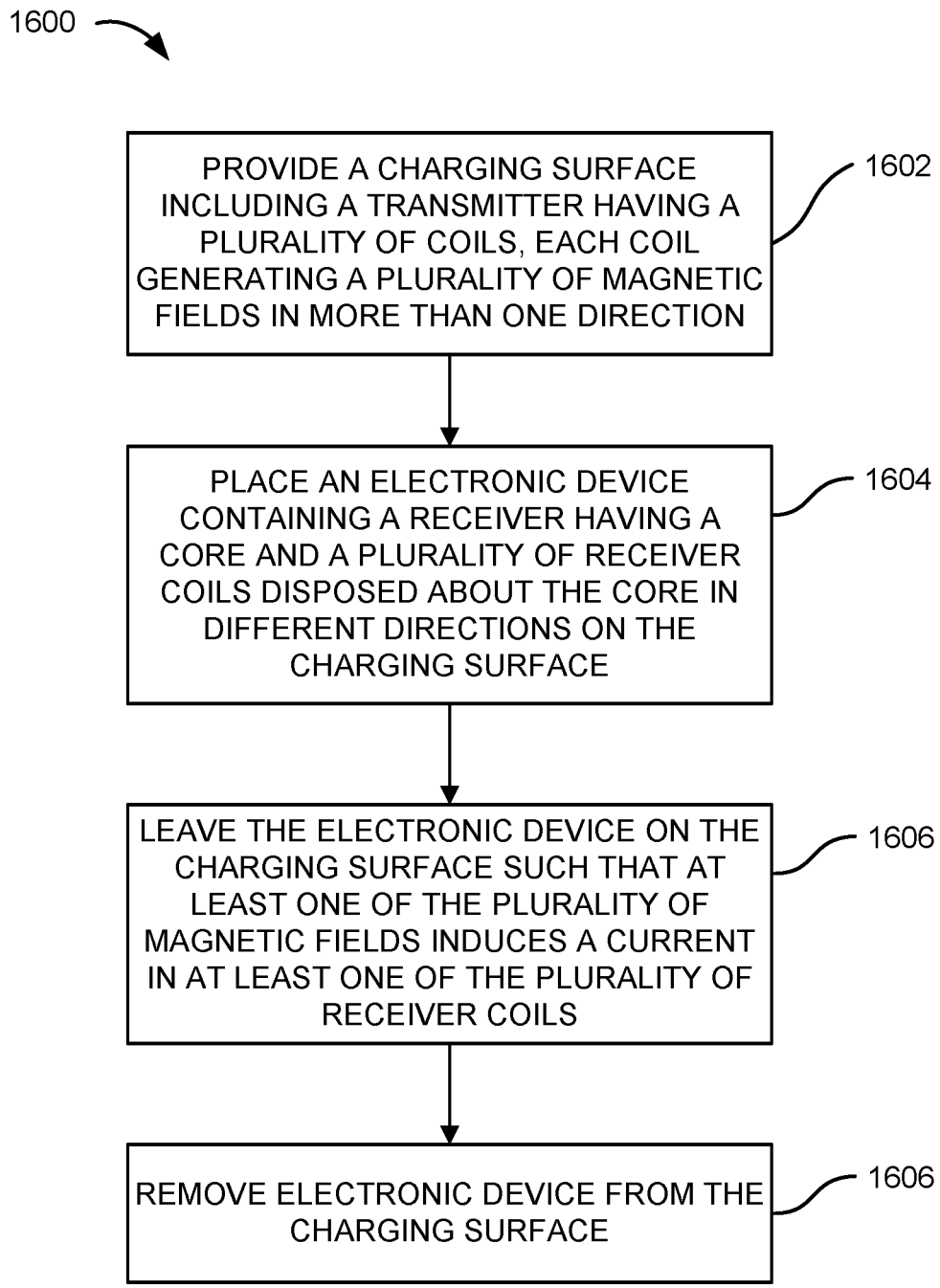
FIG. 16 is a flow diagram illustrating a method of charging an electronic device using a wireless charging station, in accordance with embodiments of the present disclosure.

FIG. 16 illustrates a flow chart 1600 for charging an electronic device according to embodiments of the present disclosure. At block 1602, a charging surface including transmitter coils having a plurality of transmitter coils may be provided. The plurality of transmitter coils may be disposed below the charging surface and may be configured to generate a plurality of magnetic fields in more than one direction when a current is supplied. The generated magnetic fields may penetrate through the charging surface such that the magnetic fields exist above the charging surface and are accessible to the electronic device when placed on the charging surface. In some embodiments, a single AC (or pulsed DC) power source and clock may be used to drive the plurality of transmitter coils.

At block 1604, the electronic device may be placed on the charging surface. The electronic device may contain a receiver having a core and a plurality of receiver coils disposed about the core in different directions. The receiver may be configured to receive power from any orientation when placed in a magnetic field.

Once placed on the charging surface, at block 1606, the electronic device may be left on the charging surface such that at least one of the plurality of magnetic fields induces a current in at least one of the plurality of receiver coils. For instance, a magnetic field may induce a current in two coils: one coil being disposed about a Y-direction, and another coil being disposed about an X-direction. The current may be rectified in the electronic device and then used to charge an internal battery.

After a desired amount of charge has been stored on the battery, then at block 1606, the electronic device may be removed from the charging surface. In some embodiments, the electronic device can be coupled to a docking station that includes the receiver, and that performs some or all of the functions performed by the electronic device described herein with respect to flow chart 1600.

Although the disclosure has been described with respect to specific embodiments, it will be appreciated that the disclosure is intended to cover all modifications and equivalents within the scope of the following claims.

What is claimed is:

1. A wireless charging table comprising:
   a table top having an upper surface upon which one or more electronic devices can be placed;
   a wireless charging transmitter positioned under the upper surface of the table top, the wireless charging transmitter comprising a plurality of transmitter coils that define a charging region at the upper surface of the table top, the plurality of transmitter coils including at least a first transmitter coil comprising:
      a first loop portion coupled to a first node and a second node different from the first node, each node providing an avenue through which current can enter and exit out of the first loop portion of the coil;
      a second loop portion coplanar with the first loop portion; and
      a crossing portion comprising overlapping conductive paths that electrically couple the first loop portion and the second loop portion such that, when an electrical current is generated in the first transmitter coil, the electrical current flows through the first loop portion in a first rotational direction, and through the second loop portion in a second rotational direction opposite the first rotational direction; and
   a power distribution system operatively coupled to the wireless charging transmitter, the power distribution system configured to receive power from an alternating current (AC) power source and distribute power to the wireless charging transmitter.

2. The wireless charging table of claim 1 wherein when the electrical current is generated in the first transmitter coil:
   a first magnetic field is generated by the current flowing through the first loop portion, the first magnetic field being characterized by a first direction; and
   a second magnetic field is generated by the current flowing through the second loop portion, the second magnetic field being characterized by a second direction different than the first direction.

3. The wireless charging table of claim 2 wherein an angle formed between the first direction and the second direction is at least 135 degrees.

4. The wireless charging table of claim 1 wherein the crossing portion is a first crossing portion, and wherein the plurality of transmitter coils further comprises a second coil configured to transmit power, the second coil comprising:
   a third loop portion;
   a fourth loop portion; and
   a second crossing portion comprising overlapping conductive paths that electrically couple the third loop portion and the fourth loop portion such that, when an electrical current is generated in the second coil, the electrical current flows:
      through the third loop portion in the first rotational direction; and
      through the fourth loop portion in the second rotational direction.

5. The wireless charging table of claim 4 wherein when the electrical current is generated in the first transmitter coil and the second coil, a bridging magnetic field is generated in a region between the first transmitter coil and the second coil.

6. The wireless charging table of claim 5 wherein the bridging magnetic field bends between the second loop portion and the third loop portion.

7. The wireless charging table of claim 1 wherein the first loop portion has a first horizontal part and a first vertical part, and the second loop portion has a second horizontal part and a second vertical part.

8. The wireless charging table of claim 7 wherein the first horizontal part extends above the second vertical part, and wherein the second horizontal part extends below the first vertical part.

9. The wireless charging table of claim 1, wherein the power distribution system includes a controller configured to communicate with an electronic device of the one or more electronic devices.

10. A wireless charging system comprising:
a table top having an upper surface upon which one or more electronic devices can be placed;
a wireless charging transmitter positioned under the upper surface of the table top, the wireless charging transmitter comprising a plurality of transmitter coils that define a charging region at the upper surface of the table top, the plurality of transmitter coils including at least a first transmitter coil comprising:
a first loop portion coupled to a first node and a second node different from the first node, each node providing an avenue through which current can enter and exit out of the first loop portion of the coil;
a second loop portion coplanar with the first loop portion; and
a crossing portion comprising overlapping conductive paths that electrically couple the first loop portion and the second loop portion such that, when an electrical current is generated in the first transmitter coil, the electrical current flows through the first loop portion in a first rotational direction, and through the second loop portion in a second rotational direction opposite the first rotational direction; and
a power distribution system operatively coupled to the wireless charging transmitter, the power distribution system configured to receive power from an alternating current (AC) power source and distribute power to the wireless charging transmitter; and
a wireless charging receiver comprising:
a first coil disposed relative to a first axis;
a second coil disposed relative to a second axis, the second axis extending in a direction different than the first axis; and
a ferromagnetic structure positioned adjacent to the first coil and the second coil, wherein the first coil, the second coil, and the ferromagnetic structure are configured to receive magnetic fields generated by the plurality of transmitter coils.

11. The wireless charging system of claim 10, further comprising:
a plurality of sensors configured to detect a presence of an electronic device.

12. The wireless charging system of claim 11, wherein the power distribution system comprises a controller coupled to the plurality of sensors and the plurality of transmitter coils.

13. The wireless charging system of claim 12, wherein the controller is configured to selectively energize one or more transmitter coils in response to the detected presence of the electronic device.

14. The wireless charging system of claim 10, wherein the wireless charging receiver is encased within a docking station.

* * * * *